US012568560B2

(12) United States Patent
Lee et al.

(10) Patent No.: US 12,568,560 B2
(45) Date of Patent: Mar. 3, 2026

(54) COOKING APPLIANCE

(71) Applicant: LG ELECTRONICS INC., Seoul (KR)

(72) Inventors: Dongmin Lee, Seoul (KR); Jaewon Byun, Seoul (KR); Ugjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 773 days.

(21) Appl. No.: 17/943,426

(22) Filed: Sep. 13, 2022

(65) Prior Publication Data

US 2023/0138482 A1 May 4, 2023

(30) Foreign Application Priority Data

Oct. 28, 2021 (KR) ........................ 10-2021-0146024
Feb. 3, 2022 (KR) ........................ 10-2022-0013988

(51) Int. Cl.
*H05B 6/64* (2006.01)
*H05B 6/76* (2006.01)

(52) U.S. Cl.
CPC ............. *H05B 6/642* (2013.01); *H05B 6/763* (2013.01)

(58) Field of Classification Search
CPC ....... F24C 15/02; H05B 6/6414; H05B 6/642; H05B 6/6435; H05B 6/763; H05B 6/766
See application file for complete search history.

(56) References Cited

U.S. PATENT DOCUMENTS

2005/0023277 A1* 2/2005 Kim ..................... H05B 6/6414 219/739
2005/0056639 A1 3/2005 Hu et al.
2005/0072777 A1 4/2005 Kim et al.
2010/0181308 A1 7/2010 Lee
2018/0010806 A1 1/2018 Monroy et al.
(Continued)

FOREIGN PATENT DOCUMENTS

CN 108644830 A * 10/2018 ........... H05B 6/6414
KR 10-2004-0090786 10/2004
(Continued)

OTHER PUBLICATIONS

International Search Report dated Aug. 25, 2022 issued in PCT Application No. PCT/KR2022/007682.
(Continued)

*Primary Examiner* — Woody A Lee, Jr.
(74) *Attorney, Agent, or Firm* — KED & ASSOCIATES

(57) ABSTRACT

A cooking appliance is provided that may include a main body formed with a cavity, and a door that opens and closes the cavity. The door may include a display module including a display disposed in front of the door, a cooling flow path unit disposed behind the display module and having formed therein a flow path through which air for cooling flows, and a shield that is disposed behind the cooling flow path unit and configured to shield electromagnetic waves generated from the main body. The cooling flow path unit may be disposed between the shielding unit and the display module. The door may include a first outlet disposed at an upper portion of the door and through which the air flowing inside of the display module is discharged to the outside, and a second outlet disposed at a lower portion of the door.

20 Claims, 24 Drawing Sheets

(56) References Cited

U.S. PATENT DOCUMENTS

| | | | | |
|---|---|---|---|---|
| 2020/0146115 | A1* | 5/2020 | Joo | H05B 6/6417 |
| 2021/0289593 | A1* | 9/2021 | Lee | H05B 6/6414 |
| 2023/0067149 | A1* | 3/2023 | Ootani | H05B 6/6411 |

FOREIGN PATENT DOCUMENTS

| | | | |
|---|---|---|---|
| KR | 10-2005-0027355 | 3/2005 | |
| KR | 10-0574857 | 4/2006 | |
| KR | 10-0811304 | 3/2008 | |
| KR | 10-2008-0070408 | 7/2008 | |
| KR | 10-2008-0070409 | 7/2008 | |
| WO | WO 2008/091060 | 7/2008 | |
| WO | WO-2008091060 A1 * | 7/2008 | F24C 15/006 |

OTHER PUBLICATIONS

Search Report dated Mar. 16, 2023 issued in EP Application No. 22201859.0.

* cited by examiner

COOKING APPLIANCE

CROSS-REFERENCE TO RELATED APPLICATION(S)

This application claims priority to and benefit of Korean Patent Application No. 10-2021-0146024 filed in Korea on Oct. 28, 2021, and 10-2022-0013988 filed in Korea on Feb. 3, 2022, which are hereby incorporated by reference as if fully set forth herein.

BACKGROUND

1. Field

A cooking appliance is disclosed herein.

2. Background

The content described in this section merely provides background information and does not constitute related art.

A cooking appliance is a home appliance that cooks food or other items (hereinafter, collectively "food") using microwaves and/or heat from a heater, which are type(s) of electromagnetic waves. The cooking appliance may generally include a cavity, which is a space in which food is placed and cooked, and a door that opens and closes the cavity.

A related art cooking appliance is disclosed in Korean Patent Application Laid-Open No. 10-2008-0070408, which is hereby incorporated by reference. When the cooking appliance is installed indoors, it is necessary to consider efficient use of the cooking appliance and an installation space, for example. For this reason, the cooking appliance may be disposed at a location adjacent to a heating cooking device, for example, a heating-type oven, or a gas range, for example. More specifically, the cooking appliance may be disposed above the heating cooking device.

When the cooking appliance is disposed above the heating cooking device, a user may conveniently cook food by reducing his/her movement in an environment where the cooking appliance and the heating cooking device are adjacent to each other. In addition, heat and oil mist, for example, generated from the heating cooking device may be discharged to the outside using the cooking appliance as a hood.

In a state in which the cooking appliance is disposed above the heating cooking device, the heat and oil mist, for example, generated from the heating cooking device disposed below the cooking appliance may adversely affect an operation of the cooking appliance. For example, a display unit may be mounted on a front surface of a door provided in the cooking appliance in order to provide various types of information to the user. The user may know a cooking state of the cooked food through the display unit.

In addition, when the display unit is connected to another home appliance and serves as a hub of the home appliance, information other than cooking information of food may be obtained through the display unit. In addition, the user may input a command required for cooking and other various commands into the display unit through a touch method.

In the state in which the cooking appliance is disposed above the heating cooking device, the heat and oil mist, for example, generated from the heating cooking device may penetrate into the display unit and other components mounted on the door. It is necessary to prevent the display unit and other components mounted on the door of the cooking appliance from being damaged or malfunctioning due to such heat and oil mist, for example.

BRIEF DESCRIPTION OF THE DRAWINGS

Embodiments will be described in detail with reference to the following drawings in which like reference numerals refer to like elements, and wherein.

DETAILED DESCRIPTION

Figure 1:
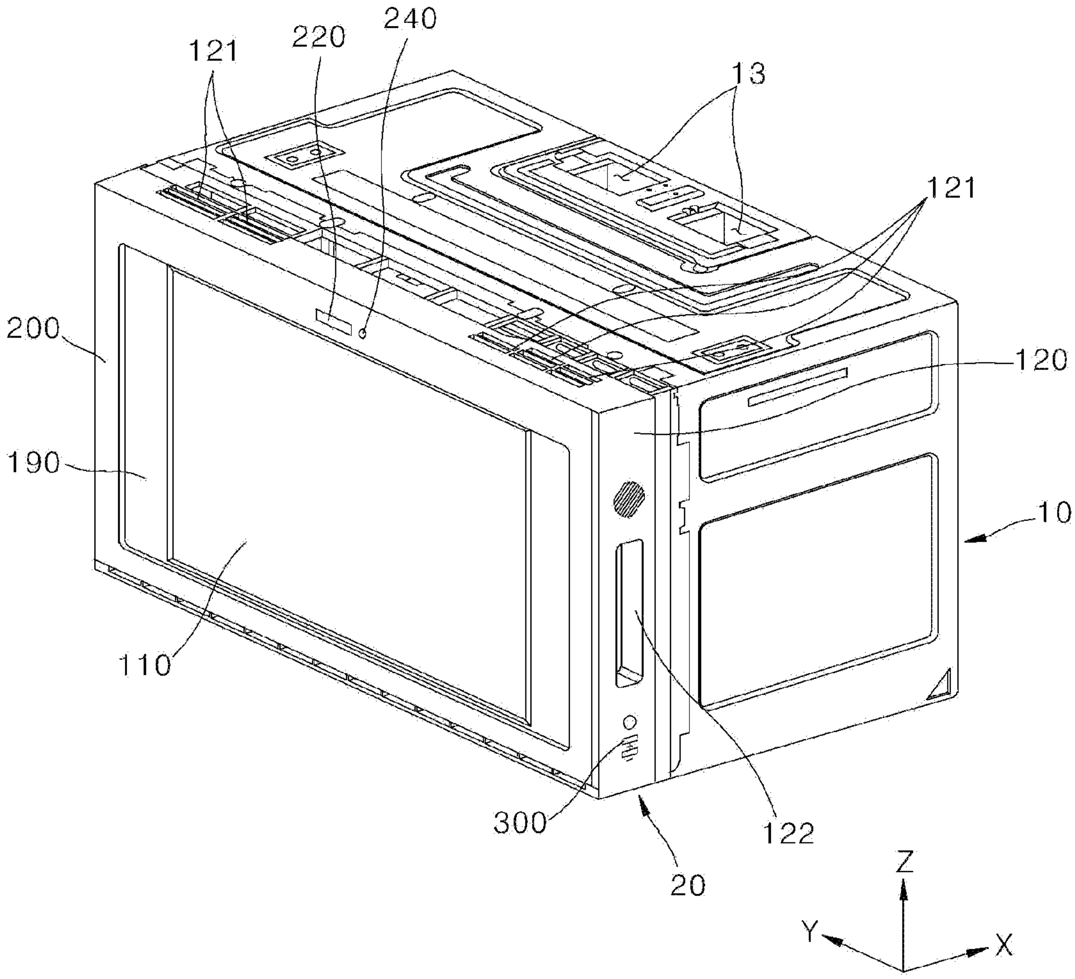
FIG. 1 is a perspective view of a cooking appliance according to an embodiment.

Objects, features, and advantages will be described hereinafter with reference to the accompanying drawings, and accordingly, those skilled in the art to which embodiments pertain will be able to easily practice the technical spirit. In describing embodiments, when it is determined that description of a known technique related to the may unnecessarily obscure the gist, unnecessary description will be omitted. Hereinafter, embodiments will be described with reference to the accompanying drawings. In the drawings, the same reference numerals are used to indicate the same or similar components.

Although the first and second, for example, are used to describe various components, it goes without saying that these components are not limited by these terms. These terms are only used to distinguish one component from other components, and unless otherwise stated, it goes without saying that the first component may also be the second component.

Throughout, unless specifically stated otherwise, each component may be singular or plural.

As used herein, the singular expression includes the plural expression unless the context clearly dictates otherwise. In the present application, terms such as "consisting of" or "comprising" should not be construed as necessarily including all of the various components or various steps described in the specification, and should be construed that some components or some steps may not be included, or additional components or steps may be further included.

Throughout, when "A and/or B" is used, it means A, B or A and B, unless specifically stated otherwise, and when "C to D" is used, it means greater than or equal to C and smaller than or equal to D unless specifically stated otherwise.

Throughout, "upward-downward direction" means the upward-downward direction of the cooking appliance in a state in which the cooking appliance is installed for daily use. "Leftward-rightward direction" means a direction perpendicular to the upward-downward direction, and the frontward-rearward direction means a direction perpendicular to both the upward-downward direction and the leftward-rightward direction. "Bilateral direction" or "lateral direction" has the same meaning as the leftward-rightward direction, and these terms may be used interchangeably in the present specification.

Figure 2:
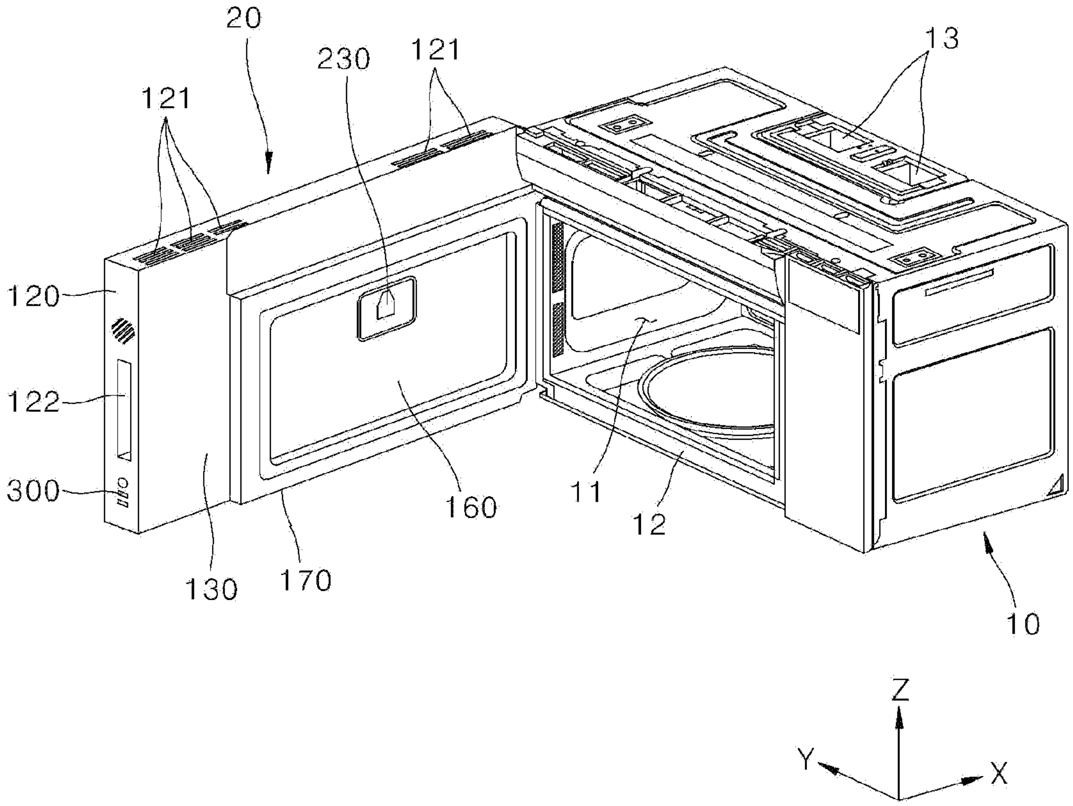
FIG. 2 is a view showing a state in which a door of the cooking appliance of FIG. 1 has been opened.

FIG. 1 is a perspective view of a cooking appliance according to an embodiment. FIG. 2 is a view showing a state in which a door of the cooking appliance of FIG. 1 has been opened.

The cooking appliance according to an embodiment may be disposed at a location spaced apart from a heating cooking device in an upward-downward direction above a location where the heating cooking device, for example, a heating-type oven or a gas range, for example, is disposed. The placement of the cooking appliance may allow a user to conveniently use cooking devices including the cooking appliance. In addition, the cooking appliance may serve as a hood of the heating cooking device disposed thereunder. In this case, the cooking appliance may be provided with components for use as a hood.

The cooking appliance may cook food using microwaves, and/or heat from a heater, which are type(s) of electromagnetic waves. The cooking appliance may include a main body 10 in which a cavity 11 is formed, and a door 20 that opens and closes the cavity 11.

Food to be cooked may be placed in the cavity 11. The door 20 may be disposed in front of the cavity 11 and rotatably mounted on the main body 10 to open and close the cavity 11.

A vent hole 13 through which air suctioned in by a suction unit provided on a lower portion of the main body 10 is discharged to the outside may be provided in an upper portion of the main body 10. The suction unit may be provided at a lower portion of the main body 10 of the cooking appliance. Accordingly, the cooking appliance may serve as a hood for suctioning the air discharged from the heating cooking device disposed thereunder to discharge the air to the outside.

The main body 10 may further include a front panel 12 provided on an edge of an entrance of the cavity 11, and having one surface disposed to face one surface of a choke member or choke 170 when the door 20 is closed to close the cavity 11.

The front panel 12 may be provided to surround the edge of the entrance of the cavity 11 and protrude with a predetermined width. Accordingly, when the door 20 is closed, an edge portion of the door 20 and the cavity 11 may overlap each other.

This structure may allow the front panel 12 to seal the cavity 11 in a state in which the door 20 is closed, thereby preventing oil, moisture, and oil mist, for example. generated in the process of cooking food placed in the cavity 11 from being discharged to the outside through an inlet of the cavity 11.

Figure 3A:
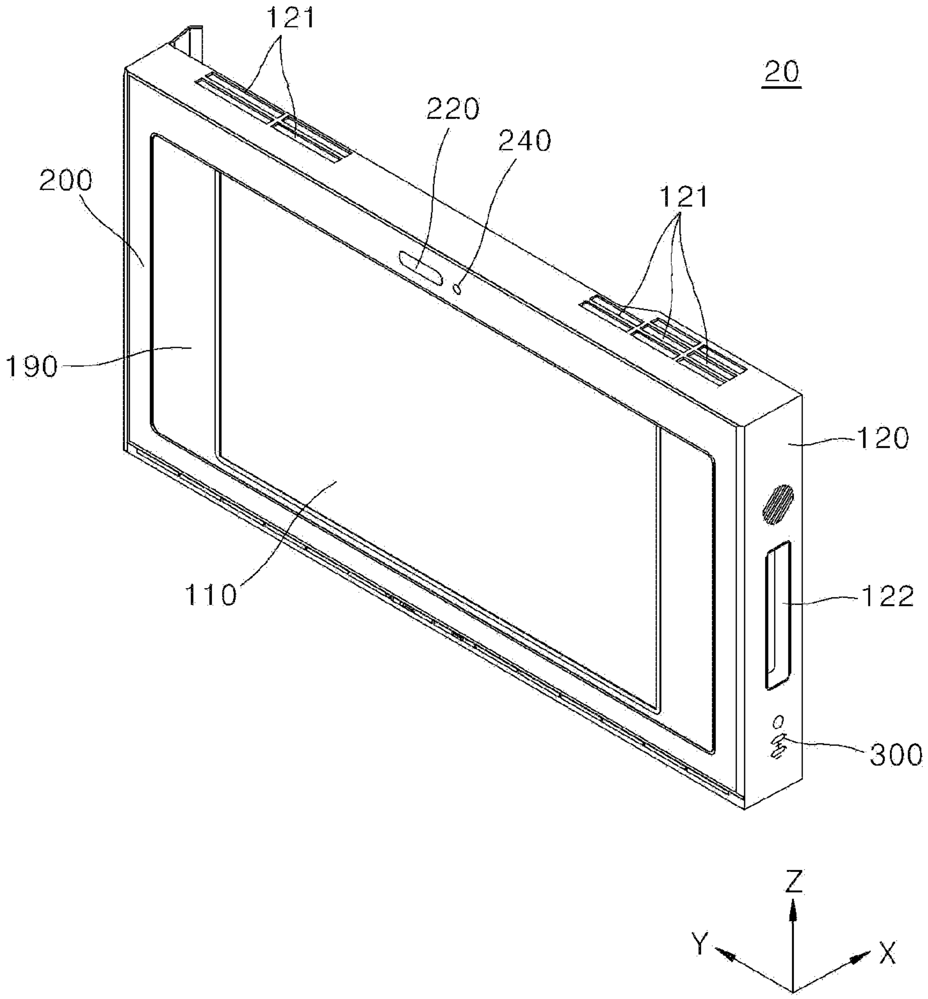
FIG. 3A is a perspective view of the door of the cooking appliance of FIG. 1.
Figure 3B:
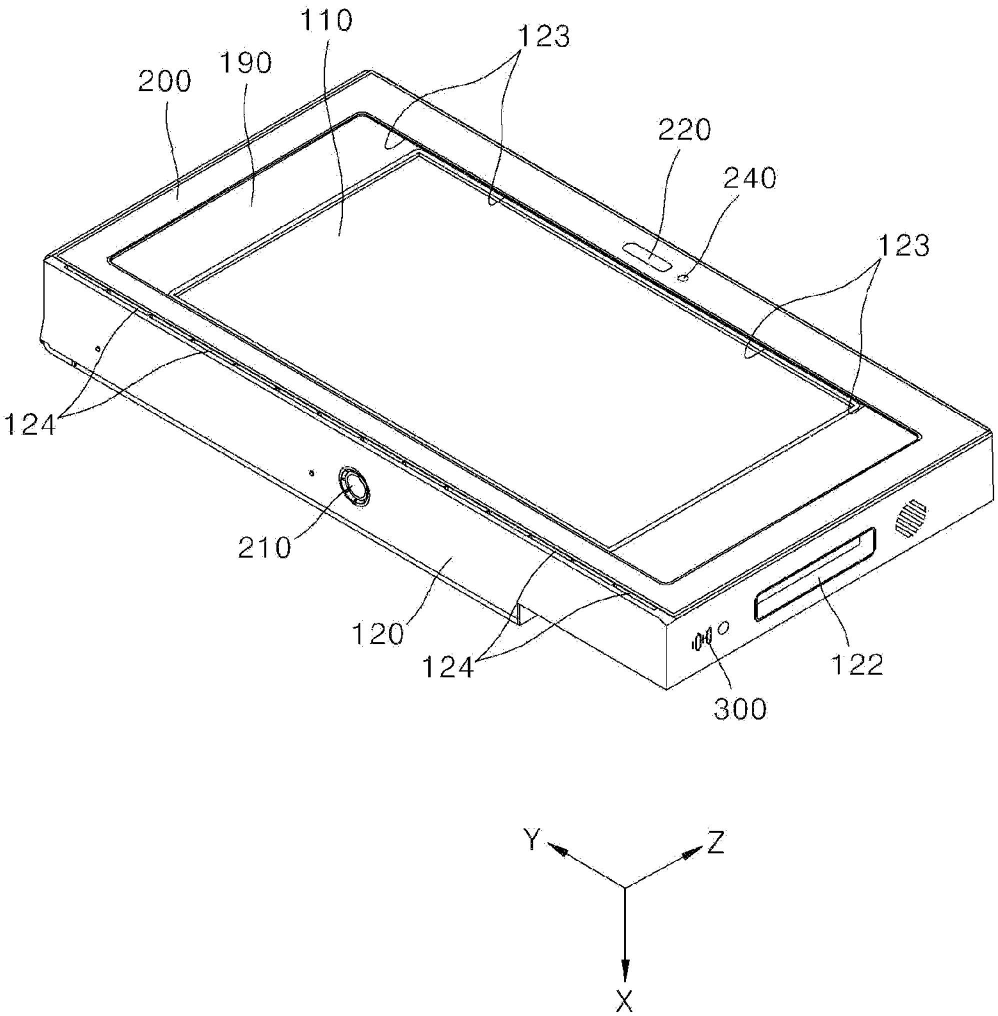
FIG. 3B is a view of the door of FIG. 3A from another direction.
Figure 4A:
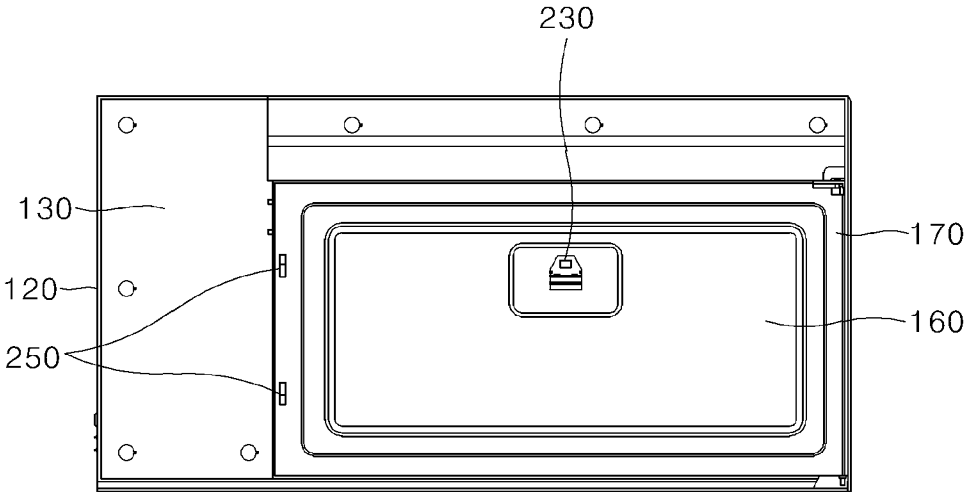
FIG. 4A is a rear view of the door of FIG. 3A.
Figure 4B:
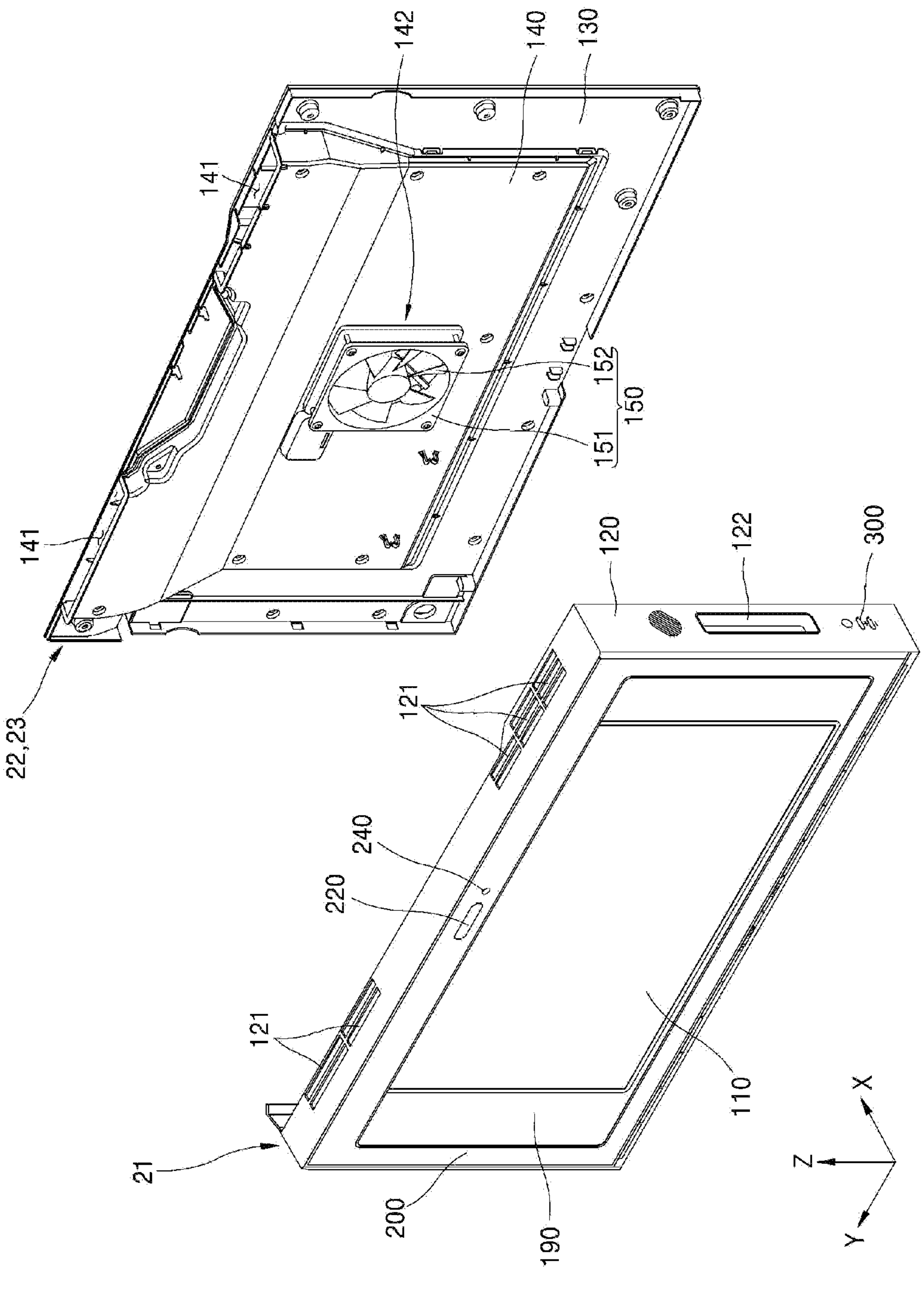
FIG. 4B is an exploded perspective view of a portion of the door according to an embodiment.
Figure 4C:
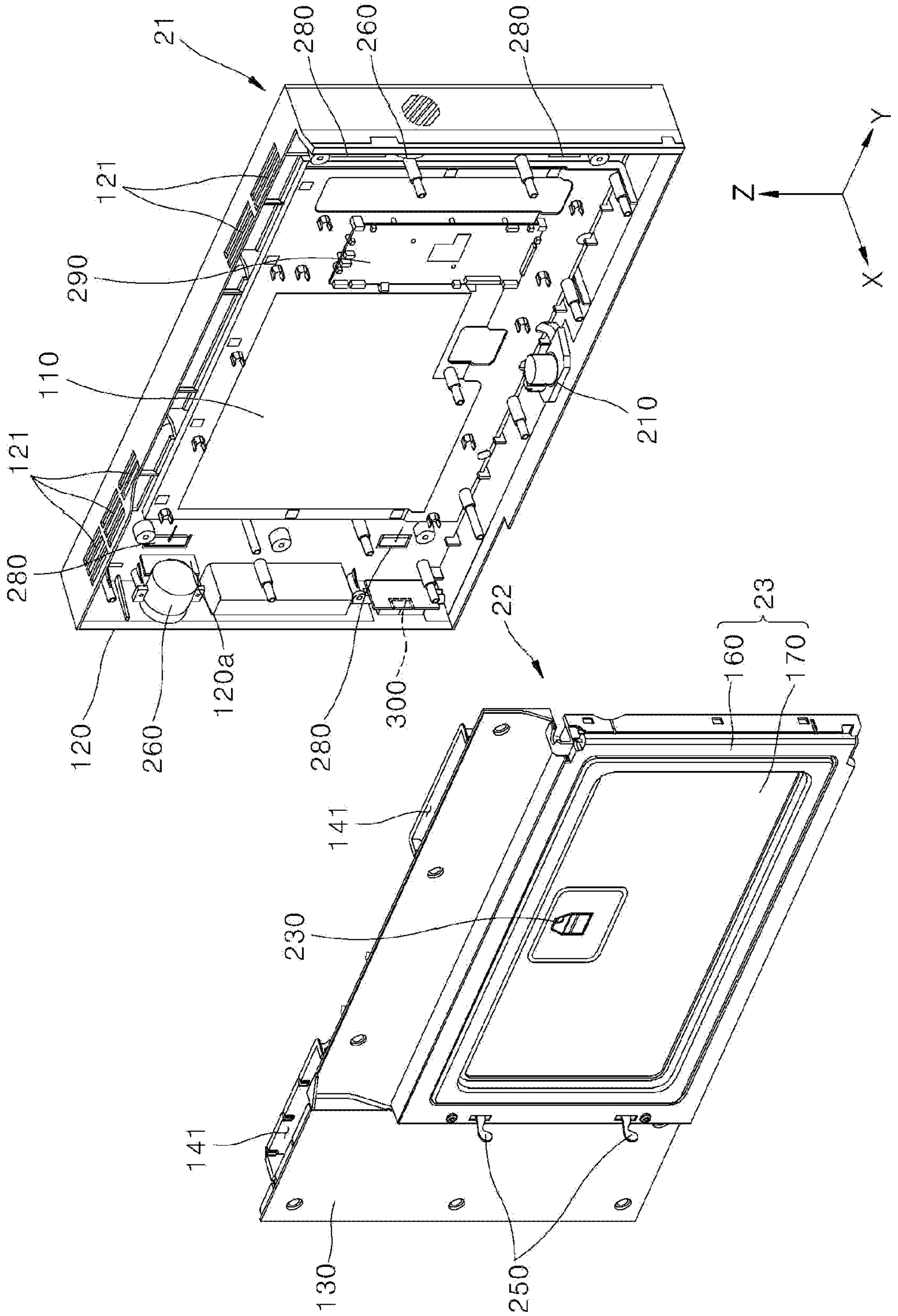
FIG. 4C is a view of the door of FIG. 4B from another direction.

FIG. 3A is a perspective view of the door of the cooking appliance of FIG. 1 according to an embodiment. FIG. 3B is a view of the door of FIG. 3A from another direction. FIG. 4A is a rear view of the door of FIG. 3A. FIG. 4B is an exploded perspective view showing a portion of the door according to an embodiment. FIG. 4C is a view of the door of FIG. 4B from another direction.

The door 20 may include a display module 21, a cooling flow path unit 22, and a shielding unit 23. The display module 21 may be disposed in front of the door 20, and the user may see an inside of the cavity 11 of the cooking appliance through the display module 21.

The cooling flow path unit 22 may be disposed behind the display module 21, and a flow path through which air for cooling may flow may be formed therein. The air flowing into the door 20 may flow into the door 20 through the cooling flow path unit 22 to cool the door 20.

The shielding unit 23 may be disposed behind the cooling flow path unit 22, and may shield electromagnetic waves generated from the main body 10. The shielding unit 23 may protect the user by blocking the electromagnetic waves generated in the cavity 11 and propagating to the outside of the cooking appliance. For example, the shielding unit 23 may serve to block the electromagnetic waves (microwaves) generated to cook food in the main body 10 from being discharged to the outside of the door 20.

The cooling flow path unit 22 may be provided to cool electronic components mounted inside of the door 20, including a display unit 110 mounted on the display module 21. The air for cooling the door 20 may flow inside of the cooling flow path unit 22. The display unit 110 may be formed in a thin shape and provided so that an area of the display unit 110 occupies most of one surface of the door 20.

Accordingly, the display unit 110 may occupy most of the area of a front portion of the door 20, and a placement area of the display unit 110 may be increased, thereby improving user visibility. The user may conveniently check various types of information through the display unit 110 provided with a large screen.

As a size of the display unit 110 is increased, an amount of heat generated may increase. Accordingly, the display unit 110 in the door 20 needs to be effectively cooled. In this embodiment, the cooling flow path unit 22, through which cooling air flows, may be separately provided.

The cooling flow path unit 22 may be disposed behind the display unit 110, and thus, the display unit 110 may be effectively cooled by the air flowing through the cooling flow path unit 22. In addition, a heat-generating component mounted on the display module 21 may be cooled by the air flowing through the cooling flow path unit 22. In other words, the cooling flow path unit 22 may cool the display module 21 provided with the display unit 110 and other various heat-generating components. In order to effectively cool the display unit 110, the entire display unit 110 may be exposed to the air flowing through the cooling flow path unit 22. In addition, the airflow discharged to the outside of the door 20 through the cooling flow path unit 22 may form an air curtain to block heat and oil mist rising from the heating cooking device disposed below the cooking appliance.

The air flowing through the cooling flow path unit 22 may be branched inside of the cooling flow path unit 22 to be discharged to a top and bottom of the display module 21. The cooling air may be branched inside of the cooling flow path unit 22 and discharged to the top and bottom of the display module 21, so that the cooling air may flow while in contact with an entire rear surface of the display unit 110 to effectively cool the display unit 110.

In addition, the cooling air may be discharged to each of the top and bottom of the display module 21 to effectively form the air curtain around the display unit 110 and the door 20, so that the heat and oil mist rising from the heating cooking device disposed below the cooking appliance may be effectively blocked by the air curtain.

The display module 21 may be provided with the display unit 110, a camera, and other electronic components, and the cooling flow path unit 22 may be provided with electronic components, such as a blowing device or blower 150 operated by a motor. Accordingly, the shielding unit 23 configured to shield the electromagnetic waves generated from the main body may be provided behind the cooling flow path unit 22 in order to protect the user and the electronic components from electromagnetic waves.

The display unit 110 and various electronic components may be disposed in the display module 21, the cooling flow path unit 22 in which the flow path of the air for cooling the display module 21 is formed may be disposed behind the display module 21, and the shielding unit 23 configured to shield electromagnetic waves from reaching the electronic components provided in the display module 21 may be disposed behind the cooling flow path unit 22.

In this embodiment, the display module 21 configured to provide various types of information and convenience to the user may be disposed on a front surface of the cooking appliance, that is, at a front of the door 20. In addition, in this embodiment, there is a need for structure that effectively cools the components, such as the display unit 110 provided in the display module 21, effectively cools an inside of the door 20 provided with the display unit 110, for example, and at a same time, forms the flow path of the cooling air for forming the air curtain around the door 20, and also protects the electronic components mounted on the door 20 from electromagnetic waves. In order to satisfy this need, the display module 21 may be disposed at the front of the door 20, the cooling flow path unit 22 may be disposed behind the display module 21, and the shielding unit 23 may be disposed behind the cooling flow path unit 22.

In other words, in order to implement the door structure according to the above-described embodiment, the display module 21, the cooling flow path unit 22, and the shielding unit 23 that play their own roles may be sequentially disposed on the door 20 from the front to a rear in the door 20. In addition, the display module 21, the cooling flow path unit 22, and the shielding unit 23 may be stably coupled to each other to prevent the cooling air from flowing outside of the door 20 through other portions other than a first outlet 123 disposed at an upper portion of the display module 21 and a second outlet 124 at a lower portion of the display module 21. Hereinafter, the door 20 implemented using the above-described structure will be described.

The display module 21 may include the first outlet 123 and the second outlet 124. The first outlet 123 may be disposed at the upper portion of the display module 21, and the air flowing inside of the display module 21 may be discharged to the outside through the first outlet 123.

The second outlet 124 may be disposed at the lower portion of the display module 21, and the air flowing inside of the display module 21 may be discharged to the outside through the second outlet 124. In other words, the air flowing inside of the door 20 may be discharged to the outside through the first outlet 123 and the second outlet 124, respectively, disposed at the upper and lower portions of the door 20, so that the air may flow through the entire inside of the door 20 to effectively cool the entire door 20.

The display module 21 may include the display unit 110 and an outer panel 120. The display unit 110 may be disposed on a front surface of the door 20 to display videos or images.

The display unit 110 may display information necessary for cooking to provide the information to the user. In addition, the display unit 110 may receive a user's command in a touch recognition method.

The display unit 110 may be connected to communicate with other home appliances, and cameras and locks, for example, provided in a front door. In addition, the display unit 110 may be connected to communicate with an external device required by the user.

The user may receive information necessary for operations of home appliances, visits by outsiders, and other aspects of daily life from the display unit 110, and transmit commands to home appliances and other devices connected to the display unit 110 using the display unit 110. Accordingly, the door 20 including the display unit 110 may serve as a kind of Internet of Things hub that transmits information about home appliances and other devices necessary for daily life to the user, and transmits the user's commands to these devices.

The outer panel 120 may be disposed behind the display unit 110, and the display unit 110 may be mounted thereon. The outer panel 120 may have a hollow 1201 and may be provided in a shape having a predetermined width in the frontward-rearward direction of the door 20.

The hollow 1201 of the outer panel 120 may be closed by a rear surface of the display unit 110. Air flowing inside of the outer panel 120 may collide with the rear surface of the display unit 110 exposed to the hollow 1201 of the outer panel 120. Accordingly, the air flowing inside of the outer panel 120 may come into contact with the rear surface of the display unit 110 to cool the display unit 110. In addition, the air passing through a blowing fan or fan 152 may be exposed to the hollow 1201 of the outer panel 120 to cool heat-generating components, such as a speaker 260, a microphone 270, a communication unit 280, and a control board 290.

As the outer panel 120 has the above-described structure, the outer panel 120 may have an interior space, and various components may be built in in the interior space. A width in the frontward-rearward direction of the door 20 may be substantially determined by the outer panel 120.

A first aperture 121 into which air may flow may be formed in an upper end of the outer panel 120. A plurality of the first aperture 121 may be provided. Each of the plurality of first apertures 121 may be provided so that a plurality of slit-shaped holes is arranged at intervals. This structure may somewhat prevent foreign substances from flowing into the door 20 through the first aperture 121.

A handle 122 may be provided on one side of the outer panel 120 to be used when the user opens and closes the door 20. The handle 122 may be formed, for example, by recessing a side portion of the outer panel 120.

A button device 300 may be mounted on one side of the outer panel 120, for example, just below a location where the handle 122 is formed. The user may supply electricity to the cooking appliance or cut off the electricity supply by manipulating the button device 300. Specific manipulation for operation of the cooking appliance is possible by inputting commands into the display unit 110.

The outer panel 120 may support various components, such as the display unit 110, the speaker 260, the microphone 270, the communication unit 280, and the control board 290, and may be formed with the first aperture 121 into which external air flows, and the first outlet 123 and the second outlet 124 through which air is discharged.

The door 20 may be provided with a camera. Images captured by the camera may be reproduced on the display unit 110, and the user may view images inside of the cavity 11 or of the lower portion of the cooking appliance through the display unit 110. The camera may include a first camera 210, a second camera 220, and a third camera 230.

The first camera 210 may be mounted on a lower portion of the outer panel 120 to capture a state of the lower portion of the door 20. As the first camera 210 is mounted on the lower portion of the outer panel 120 so that a gaze direction faces the lower portion of the cooking appliance, the first camera 210 may capture a heating cooking device disposed below the cooking appliance.

The user may observe a state of the heating cooking device and a state of food being cooked on the heating cooking device by the image captured by the first camera 210 and reproduced on the display unit 110.

The second camera 220 may be disposed on the upper portion of the door 20 and may capture the front of the door 20. The second camera 220 may capture the front of the cooking appliance.

The second camera 220 may pass through a baffle 190 and a front cover 200, which will be described hereinafter. The user may observe a situation in front of the cooking appliance captured and recorded by the second camera 220.

The second camera 220 may capture the user in front of the cooking appliance. Accordingly, the second camera 220 may be used for the user to make a video call with other people in a remote location outside of the front door using the display unit 110.

The third camera 230 may be mounted on a frame 160 described hereinafter, may be disposed to face the cavity 11, and may capture an image of the cavity 11. In other words, the third camera 230 may face the cavity 11 to capture a situation within the cavity 11. The user may observe a situation in which food is cooked in the cavity 11 through the image captured by the third camera 230.

The door 20 may include a human detection unit or human detector 240 disposed on the upper portion of the door 20, mounted by passing through the baffle 190 and the front cover 200, disposed at a location spaced apart from the second camera 220, and configured to detect a presence of the user in front of the cooking appliance. The human detector 240 may detect whether there is a person in front of the door 20 by, for example, infrared recognition or gesture recognition. A control unit provided in the cooking appliance may identify whether there is a user in front of the cooking appliance through the human detector 240.

When there is a user, for example, the control unit may operate the display unit 110 to activate functions of the cooking appliance necessary for the user's convenience and safety by taking an action to enable the user to use the display unit 110 immediately.

Figure 5:
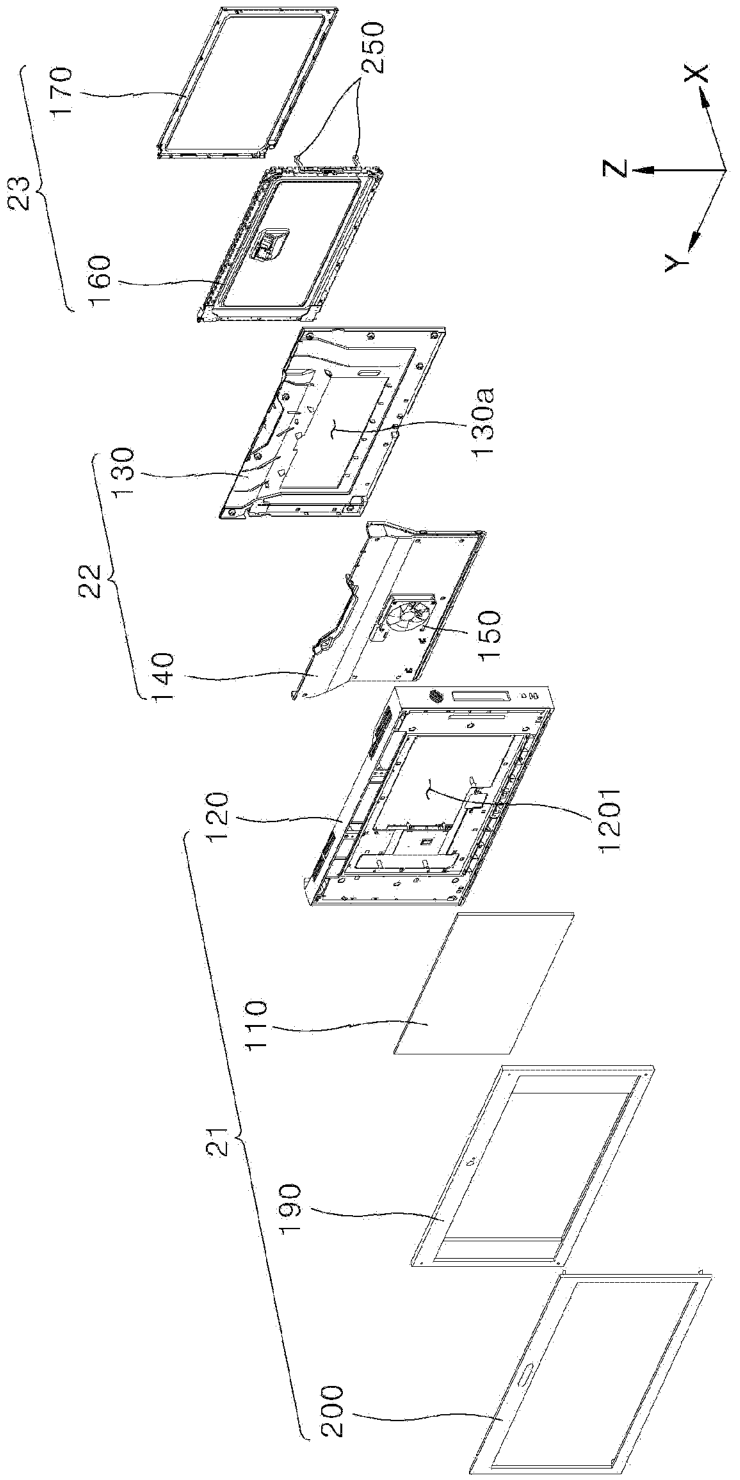
FIG. 5 is an exploded perspective view of the door according to an embodiment.
Figure 6:
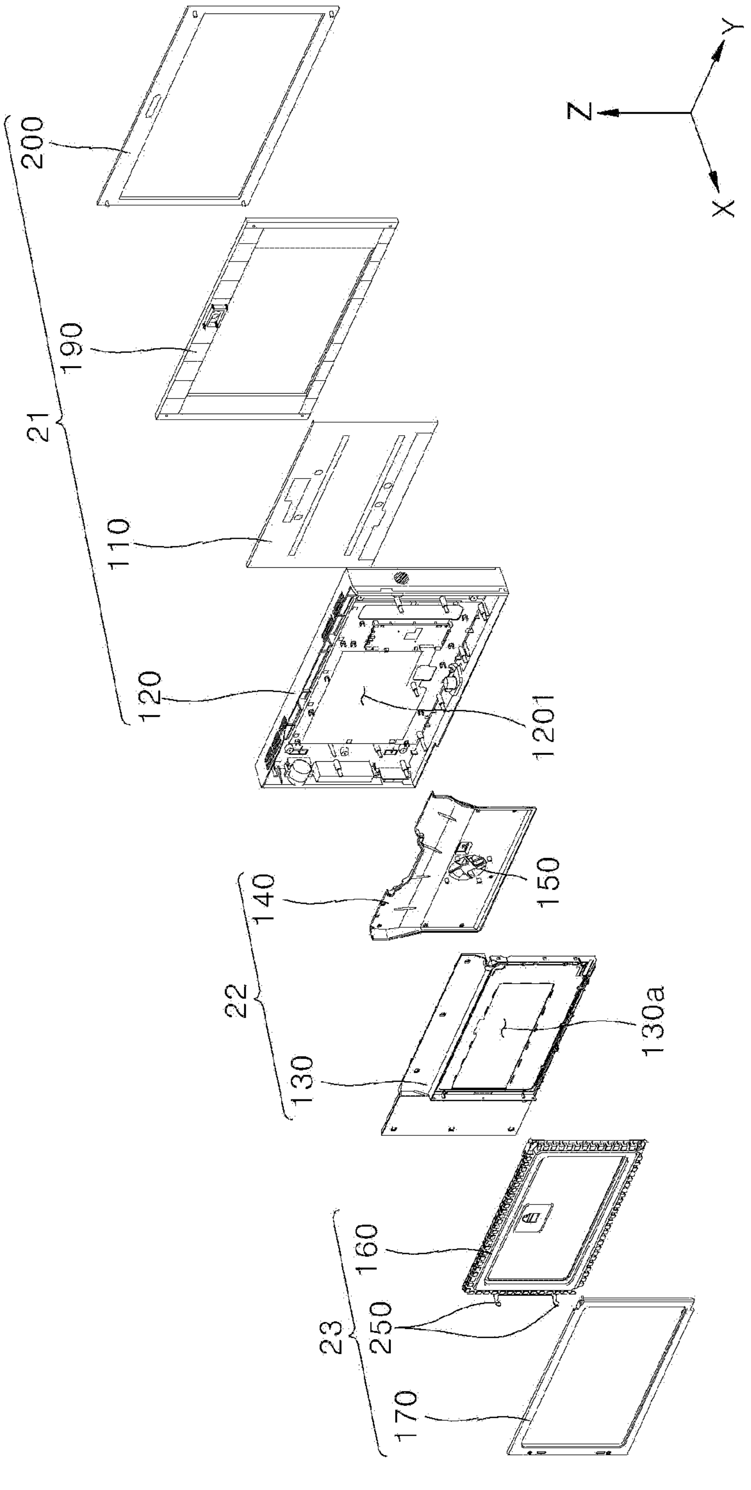
FIG. 6 is a view of the door of FIG. 5 from another direction.

FIG. 5 is an exploded perspective view of the door according to an embodiment. FIG. 6 is a view of the door of FIG. 5 from another direction.

The cooling flow path unit 22 may include an inner panel 130, an air guide 140, and the blower 150. The inner panel 130 may be disposed behind the outer panel 120 and mounted on the outer panel 120. The air guide 140 described hereinafter may be mounted on the inner panel 130. The inner panel 130 along with the air guide 140 may form a space in which the air suctioned into the door 20 flows. The inner panel 130 may be mounted with the air guide 140 and coupled to the frame 160 to provide the space in which the air flowing into the door 20 flows.

The air guide 140 may be disposed between the outer panel 120 and the inner panel 130, and coupled to the inner panel 130. The air guide 140 may guide the flow of air flowing into the door 20 from the outside, and form the space in which the air may flow.

The blower 150 may be mounted on the air guide 140. The blower 150 may forcibly blow the air flowing into the air guide 140 from a rear to a front of the air guide 140.

The shielding unit 23 may include the frame 160 and the choke 170. The frame 160 may be disposed behind the inner panel 130, may be coupled to the inner panel 130, and may have one side rotatably coupled to the main body 10. As the frame 160 rotates, the door 20 may be rotated to open and close the cavity 11 of the cooking appliance.

The frame 160 may be coupled to the inner panel 130 to form a flow path of air for cooling, and at the same time, may form an inner surface of the door 20 with a shielding structure that prevents leakage of electromagnetic waves, that is, the choke 170.

The choke 170 may be disposed behind the frame 160, may be coupled to the frame 160, and may block electromagnetic waves generated in the main body 10 from being discharged to the outside. The choke 170 may be generally provided in a quadrangular shape having a hollow, for example, and may surround an edge portion of the frame 160.

The display module 21 may include the baffle 190 and the front cover 200. The baffle 190 may be disposed in front of the display unit 110, may surround an edge of the display unit 110, and may be coupled to the outer panel 120 to mount the display unit 110 on the outer panel 120.

The baffle 190 may be generally formed in, for example, a quadrangular shape having a hollow to surround the edge of the display unit 110, and thus, may serve as a bezel of the display unit 110. The front cover 200 may be disposed in front of the baffle 190, and surround an edge of the baffle 190. The front cover 200 may be generally formed in a quadrangular shape having a hollow, for example, and may serve to stably couple the display unit 110 and the baffle 190 to the outer panel 120.

Figure 7:
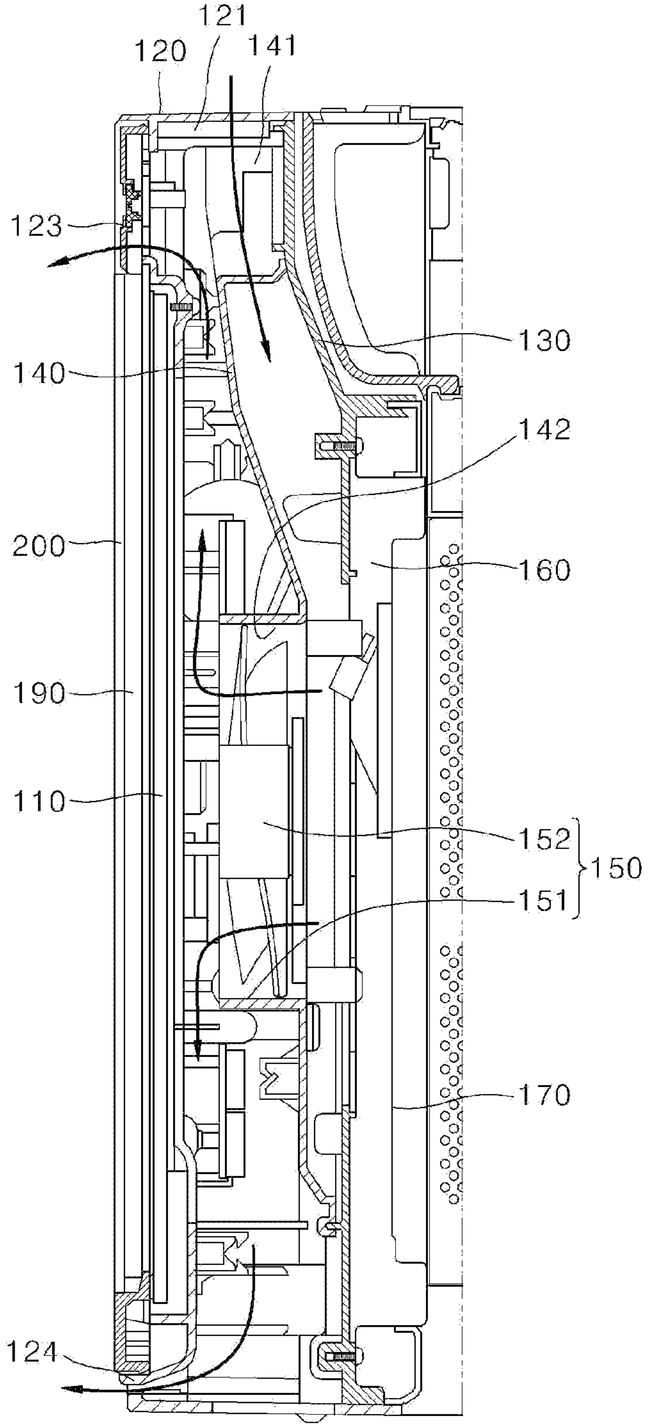
FIG. 7 is a side cross-sectional view of the door according to an embodiment.
Figure 8:
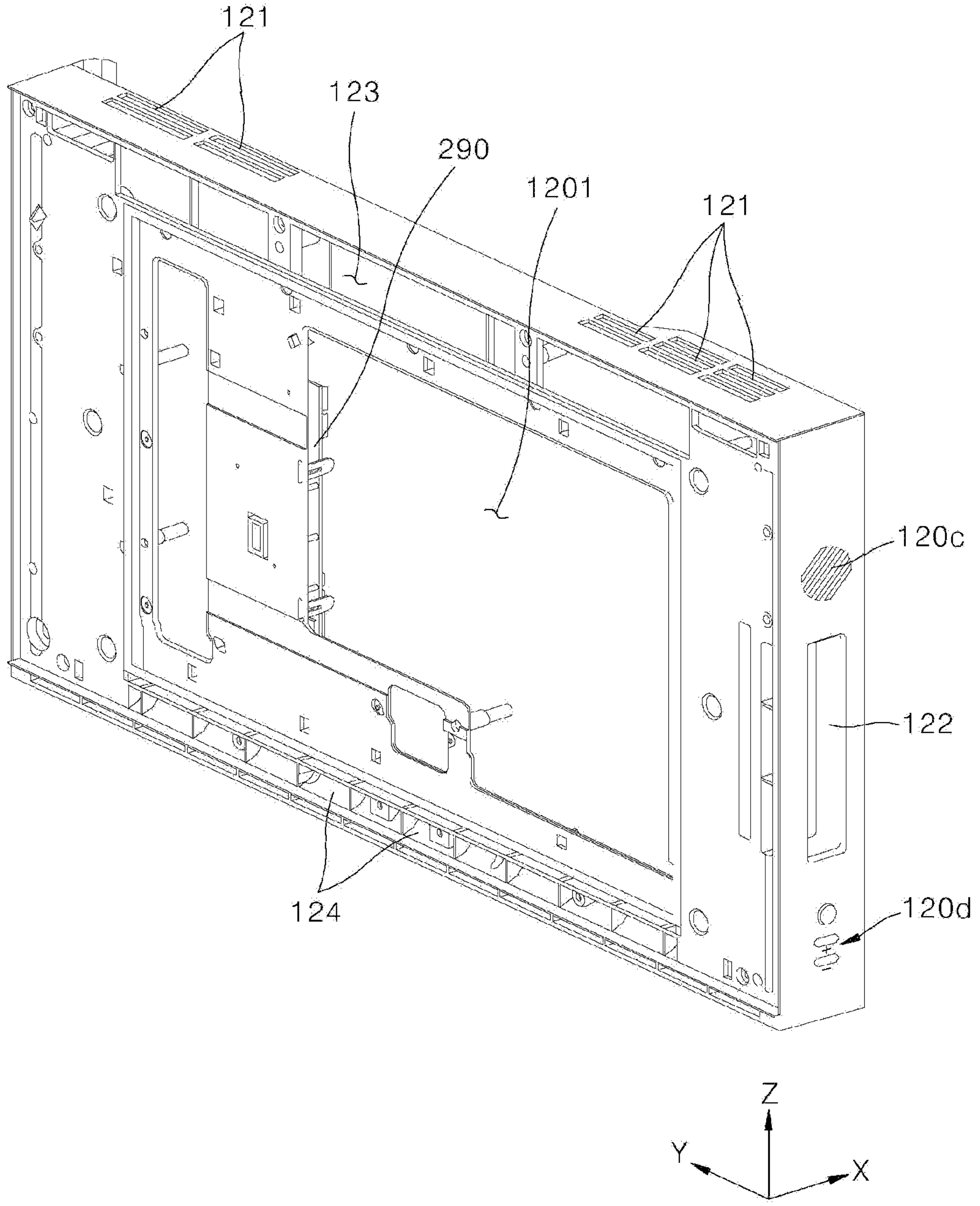
FIG. 8 is a perspective view of an outer panel according to an embodiment.
Figure 9A:
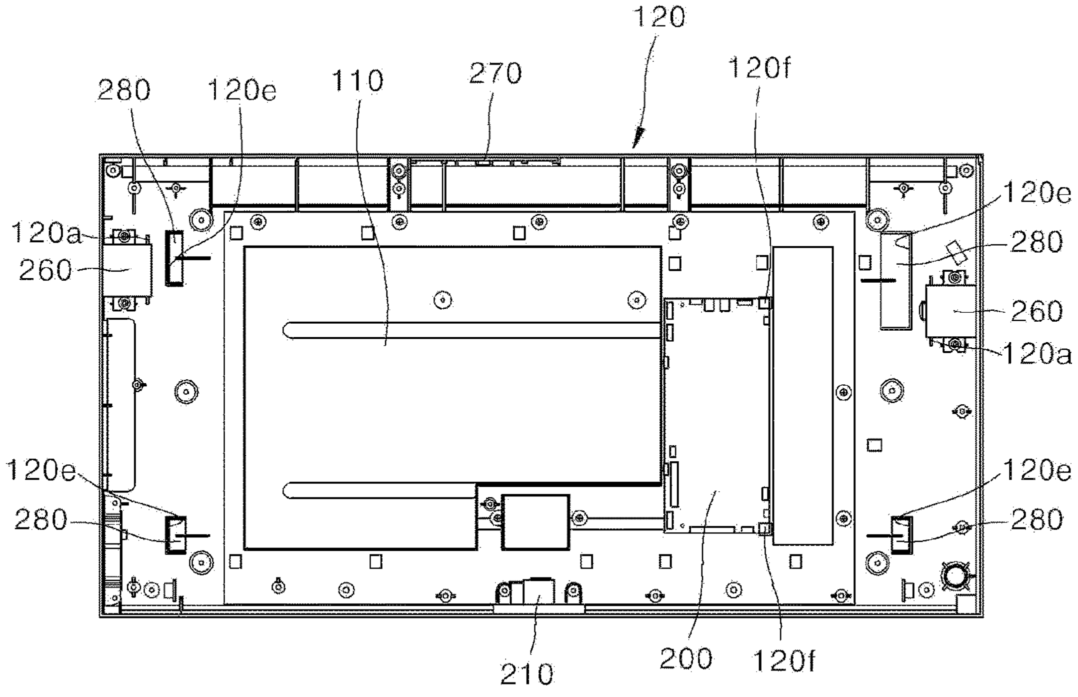
FIG. 9A is a rear view of the outer panel of FIG. 8.
Figure 9B:
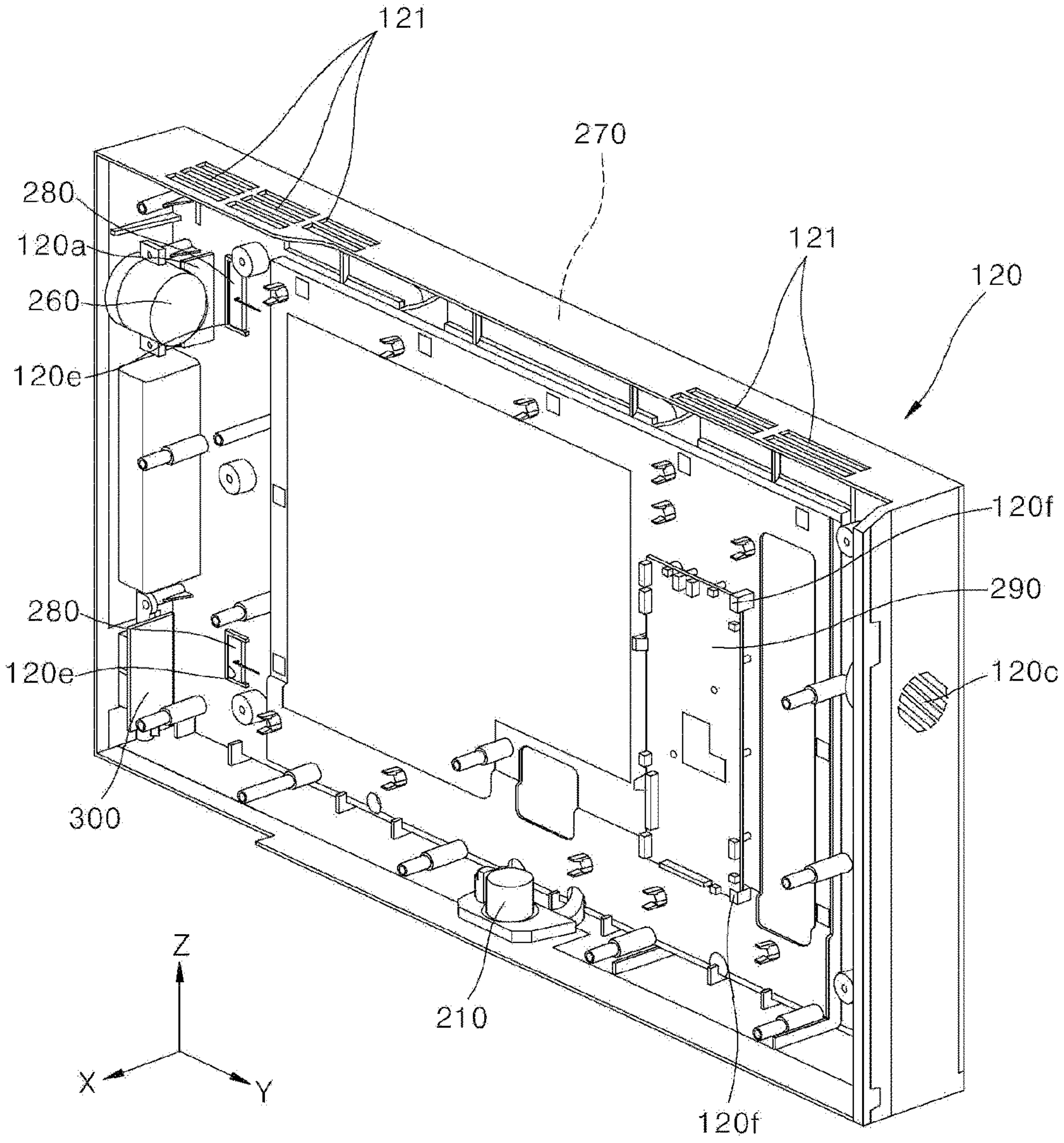
FIG. 9B is a view of the outer panel of FIG. 8 from another direction.
Figure 10:
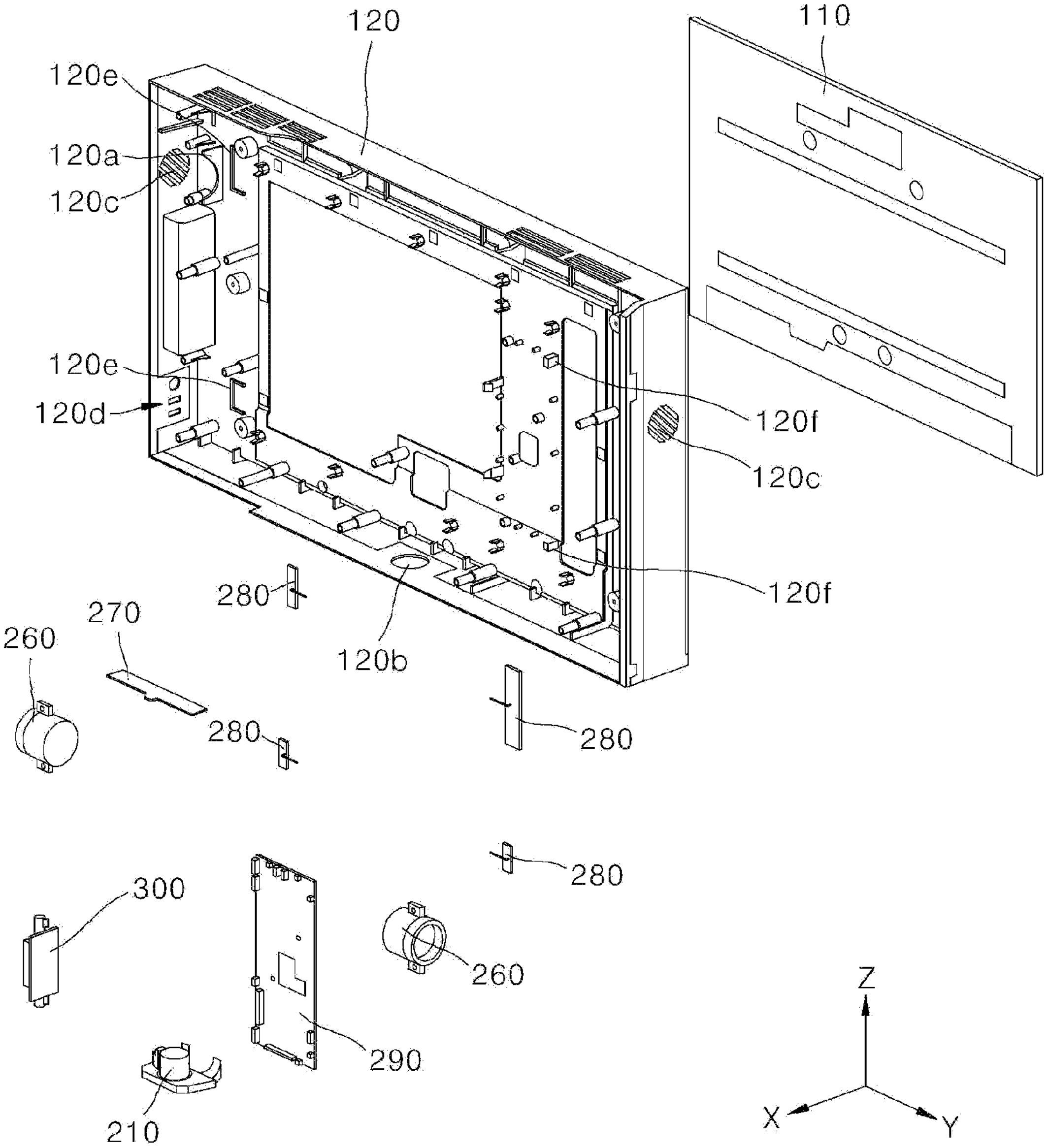
FIG. 10 is an exploded perspective view of a display unit and the outer panel according to an embodiment.
Figure 11:
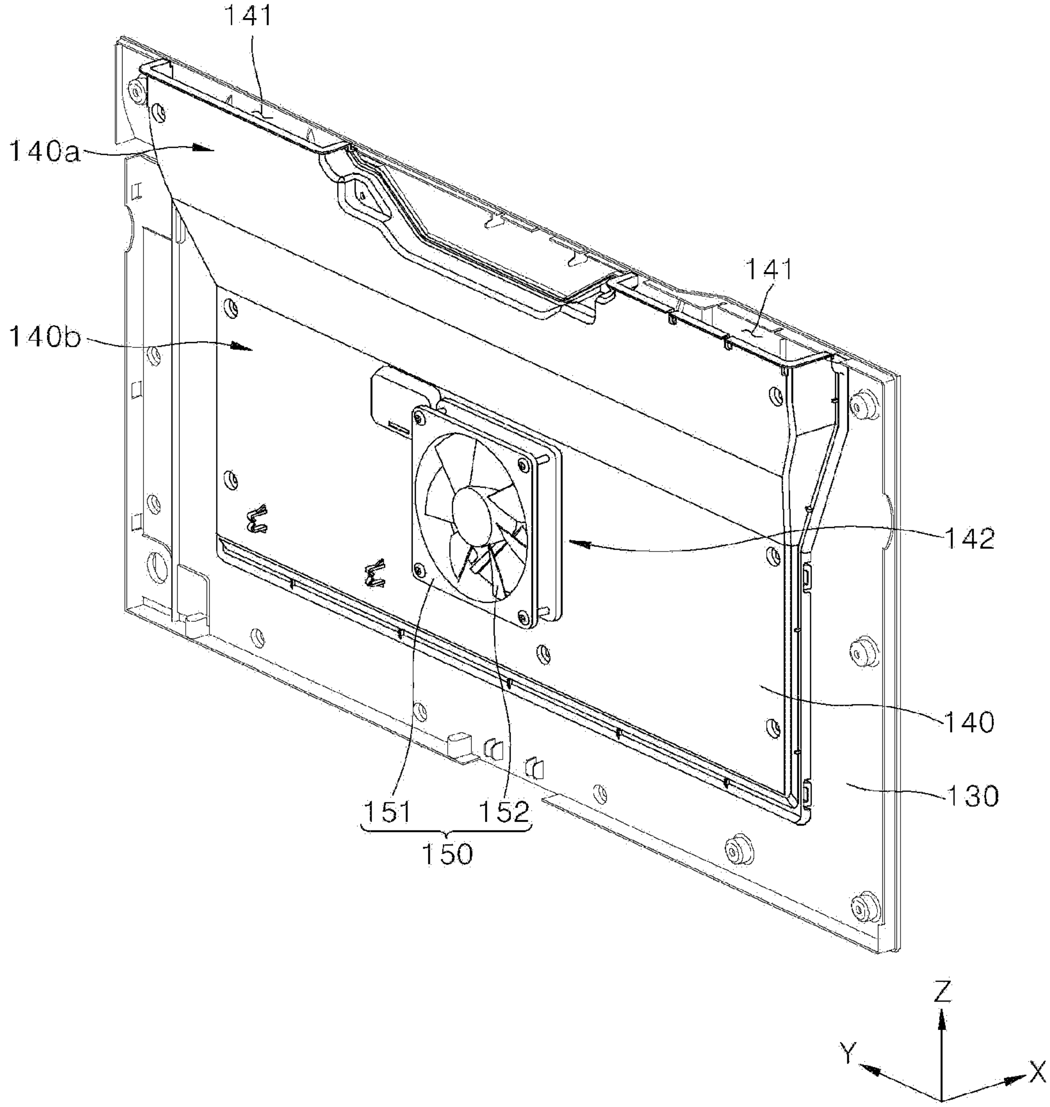
FIG. 11 is a view of an inner panel and an air guide according to an embodiment.

FIG. 7 is a side cross-sectional view of the door according to an embodiment. FIG. 8 is a perspective view of the outer panel according to an embodiment. FIG. 9A is a rear view of the outer panel according to an embodiment. FIG. 9B is a view of the outer panel of FIG. 8 from another direction. FIG. 10 is an exploded perspective view of the display unit and the outer panel according to an embodiment. FIG. 11 is a view showing the inner panel and the air guide according to an embodiment.

Referring to FIG. 10, the outer panel 120 may include the speaker 260, the microphone 270, and the communication unit 280. At least one speaker 260 may be mounted on a side of the outer panel 120. The speaker 260 may generate a voice, or an alarm sound, for example, necessary for operating the cooking appliance. In addition, the speaker 260 may generate all voices or alarm sounds, for example, for the door 20 including the display unit 110 of the door 20 to serve as an Internet of Things hub.

The microphone 270 may be mounted at a top of the outer panel 120 and may receive the user's voice. The user may input voice commands to operate the cooking appliance through the microphone 270. In addition, the microphone 270 may be a component of the door 20 serving as an Internet of Things hub.

The communication unit 280 may be mounted on the outer panel 120 at a location spaced apart from the speaker 260 and the microphone 270. As the door 20 serves as an Internet of Things hub, the communication unit 280 provided in the door 20 may be appropriately provided to perform various types of wired or wireless communication functions.

Accordingly, a plurality of the communication unit 280 may be provided Each communication unit 280 may be provided as a device corresponding to a different communication method.

For example, the communication unit 280 may be provided as a wireless communication device. Each communication unit 280 may be provided as any one of a ZigBee communication device, a Wi-Fi communication device, a jet wave communication device, and a Bluetooth communication device, for example. However, the communication method of the communication unit 280 is not limited thereto, and the communication unit 280 may also be provided as a wired communication device.

The control board 290 that controls the cooking appliance may be mounted on the outer panel 120. A control unit configured to control the cooking appliance may be implemented on the control board 290.

The outer panel 120 may be provided with a holder 120*a*, an opening hole 120*b*, a first through hole 120*c*, a second through hole 120*d*, a mounting guide 120*e*, and a fitting projection 120*f*. The holder 120*a* may be provided to support the speaker 260. The holder 120*a* may protrude from an inner wall of the outer panel 120, a portion of which may have an arc shape to correspond to a circular shape of the speaker 260.

The speaker 260 may be mounted on the holder 120*a* and provided on the outer panel 120. As a pair of speakers 260 is provided, a pair of holders 120*a* may also be provided and formed at a location corresponding to each of the pair of speakers 260.

The opening hole 120*b* may pass through a bottom of the outer panel 120. The first camera 210 may be disposed at a location adjacent to the opening hole 120*b* to be able to view the lower side of the outer panel 120 through the opening hole 120*b*.

The first through hole 120*c* may be formed in a side of the outer panel 120. The first through hole 120*c* may be provided adjacent to a location at which the speaker 260 is disposed. The first through hole 120*c* may allow the speaker 260 to communicate with the outside, and at the same time, may be formed in a mesh shape in order to prevent the speaker 260 from being exposed to the outside.

The speaker 260 may communicate with the outside of the outer panel 120 through the first through hole 120*c* to effectively transmit an alarm and other voices to the user. As a pair of speakers 260 is provided, a pair of first through holes 120*c* may also be provided and formed at a location corresponding to each of the pair of speakers 260.

The second through hole 120*d* may be formed in a lower portion of one side of the outer panel 120 to pass through the outer panel 120. A portion of the button device 300 mounted inside of the outer panel 120 through the second through hole 120*d* may be exposed to the outside of the outer panel 120. The user may manipulate the button device 300 by contacting the exposed portion of the outer panel 120.

The mounting guide 120*e* may be formed on an inner wall of the outer panel 120 to support the plurality of communication units 280. Accordingly, the mounting guide 120*e* may be provided in a same number as the plurality of communication units 280. The mounting guide 120*e* may guide the communication unit 280 to be mounted on the outer panel 120.

For example, the mounting guide 120*e* may be provided so that a projection having a shape corresponding to an edge of the communication unit 280 is formed on the inner wall of the outer panel 120. Each of the plurality of mounting guides 120*e* may be provided to have a shape and size corresponding to a shape and size of each of the plurality of communication units 280.

The fitting projection 120*f* may protrude from the inner wall of the outer panel 120. A plurality of fitting projections 120*f* may be provided and spaced apart from each other. The control board 290 may be fitted into the fitting projections 120*f*. For example, the fitting projection 120*f* may be disposed at a location adjacent to an edge of the plate-shaped control board 290.

Accordingly, the control board 290 may have corners fitted into the fitting projections 120*f* and may be mounted on the outer panel 120. A shape fitting structure corresponding to the shape of the control board 290 may be formed on the fitting projection 120*f* so that the corner of the control board 290 may be fitted thereto.

As shown in FIG. 8, the first outlet 123 may be disposed on the upper portion of the outer panel 120, and the second outlet 124 may be disposed on the lower portion of the outer panel 120. The first outlet 123 may be disposed on the upper portion of the outer panel 120, and the air blown by the blower 150 may be discharged to the outside. The second outlet 124 may be disposed on the lower portion of the outer panel 120, and the air blown by the blower 150 may be discharged to the outside.

Referring to FIG. 3B, when the door 20 is assembled, the first outlet 123 and the second outlet 124 may be partially blocked by the baffle 190 and the front cover 200. At this time, holes for discharging air may be formed at locations corresponding to the first outlet 123 and the second outlet 124 in the baffle 190.

The first outlet 123 may be provided at a location adjacent to an upper end of the display unit 110, and the second outlet 124 may be provided at a location adjacent to a lower end of the display unit 110. Accordingly, the air forcibly blown inside the door 20 by the blower 150 may be discharged to the outside at locations adjacent to upper and lower ends of the display unit 110 through the first outlet 123 and the second outlet 124.

The air discharged through the first outlet 123 may form the air curtain on the upper portion of the door 20. In addition, the air discharged through the second outlet 124 may form the air curtain on the lower portion of the door 20.

The term "air curtain" refers to means for blocking permeation of an external airflow into the door 20. In this embodiment, a boundary surface or a boundary zone in which the flow of air discharged from the inside of the door 20 through the first outlet 123 and the second outlet 124 forms a boundary against the flow of the external air may be referred to as an "air curtain".

The air curtain formed by the air discharged from the inside of the door 20 through the first outlet 123 and the second outlet 124 may prevent permeation of external air into the door 20. As the heating cooking device is disposed below the cooking appliance, heat generated when the heating cooking device is used and oil mist generated from food being cooked may rise and permeate into the cooking appliance.

The heat transmitted from the heating cooking device to the cooking appliance may damage components of the door 20 provided in the cooking appliance. In particular, components in which the display unit 110 and circuits and elements, for example, related to its operation are embedded may be vulnerable to heat.

In addition, the oil mist transmitted from the food being cooked may be attached to the door 20 provided in the cooking appliance. The oil mist may be attached to the surface of the display unit 110 to lower image quality of the display unit 110, and attached to the surfaces of other components mounted on the door 20 to damage these components.

In this embodiment, the airflow discharged to the outside of the door 20 through the first outlet 123 and the second outlet 124 provided in the door 20 forms the air curtain, so that the heat and oil mist rising from the heating cooking device disposed below the cooking appliance may be effectively blocked by the air curtain. Accordingly, it is possible to effectively prevent various electronic components including the display unit 110 provided in the door 20 from being damaged or degraded by the heat and the oil mist.

Referring to FIG. 11, the air guide 140 may include an inlet 141 and a mounting hole 142. The inlet 141 may be disposed on an upper portion of the air guide 140, external air may be introduced through the inlet 141, and at least one inlet 141 may be provided.

The inlet 141 may be disposed at a location corresponding to the first aperture 121 provided on the upper portion of the outer panel 120. Accordingly, the external air may pass through the first aperture 121 of the outer panel 120 to flow into the door 20 through the inlet 141.

The mounting hole 142 may be formed in a lower portion of the inlet 141 in the air guide 140, and the blower 150 may be mounted therein. The mounting hole 142 may pass through the air guide 140 in the frontward-rearward direction of the door 20. Accordingly, air may flow from the upper portion to the lower portion of the air guide 140 through the inlet 141, and its direction may be changed, so that the air may flow from the rear to the front of the air guide 140 through the mounting hole 142.

The blower 150 may include a casing 151 and the blowing fan 152. The casing 151 may be disposed in the mounting hole 142 and formed with a hollow, and the blowing fan 152 may be mounted in the hollow.

The blowing fan 152 may be rotatably mounted in the casing 151, and may blow air from the rear to the front of the air guide 140. The blowing fan 152 may receive electricity and rotate to blow air inside of the door 20.

By rotation of the blowing fan 152, external air may flow into the door 20 through the inlet 141, and may be discharged to the outside of the door 20 through the first outlet 123 and the second outlet 124. The mounting hole 142 of the air guide 140 may be formed in a middle of the casing 151 and correspond to a location, area, and shape of the hollow in which the blowing fan 152 is disposed.

Hereinafter, the airflow inside of the door 20 will be described with reference to FIG. 7. In FIG. 7, the airflow is indicated by arrows.

As the blowing fan 152 rotates, external air may flow into the door 20 through the inlet 141 of the air guide 140, and flow to be discharged to the outside of the door 20 through the first outlet 123 and the second outlet 124. The air forcibly blown by the blowing fan 152 may specifically have the following flow path.

The air may flow into the door 20 from the first aperture 121 of the outer panel 120 and the inlet 141 provided at a location corresponding thereto. The air flowing into the door 20 may flow downward from the door 20 to flow into the blowing fan 152.

The air may pass through the blowing fan 152 in the frontward-rearward direction of the door 20. At this time, the air may pass through the mounting hole 142 of the air guide 140 while passing through the blowing fan 152. A flow direction of the air in the blowing fan 152 may be changed from the upward-downward direction of the door 20 to the frontward-rearward direction thereof.

As a front of the mounting hole 142 is blocked by the display unit 110, the air passing through the mounting hole 142 may be branched in the upward-downward direction in front of the air guide 140. A first portion of the branched air may flow upward from the door 20 and may be discharged through the first outlet 123. A second portion of the branched air may flow downward from the door 20 and may be discharged through the second outlet 124.

The air branched from the first outlet 123 and the second outlet 124 may surround the entire door 20. In particular, the branched air may surround a front surface of the door 20. This structure may allow the air discharged from the first outlet 123 and the second outlet 124 to form the air curtain on the door 20, thereby effectively preventing heat and oil mist generated from the heating cooking device disposed below the cooking appliance from permeating into the door 20.

At least a portion of the air discharged from the first outlet 123 may come into contact with the front surface of the display unit 110 while moving downward by gravity to cool the display unit 110. In addition, the above-described airflow structure inside of the door 20 may allow the air flowing into the door 20 to flow through the entire inside of the door 20. For example, the air may flow in the entire space formed by the rear surface of the display unit 110 and the outer panel 120.

Accordingly, the air flowing inside of the door 20 may cool the entire rear surface of the display unit 110, and effectively cool the outer panel 120 and other components mounted on other portions of the door 20. In particular, the outer panel 120 may be provided with components that generate heat, such as the speaker 260, the microphone 270, the communication unit 280, and the control board 290. These heat-generating components may be disposed over the entire outer panel 120. Accordingly, the air may flow through the entire inside of the outer panel 120, thereby effectively cooling these heat-generating components.

As shown in FIG. 7, the first aperture 121 and the inlet 141 into which air flows may communicate with each other. As the blowing fan 152 rotates, the external air may flow into the air guide 140 through the first aperture 121 and the inlet 141 to flow toward the blower 150 through the space formed by the inner panel 130 and the air guide 140.

The air may flow toward the blowing fan 152 of the blower 150 in the space formed by the frame 160. The air may pass through the blowing fan 152 and collide with the rear surface of the display unit 110 disposed to face the blowing fan 152 to cool the display unit 110.

After the air passing through the blowing fan 152 collides with the rear surface of the display unit 110, the flow may be branched in the upward and downward direction of the display unit 110. The air directed to the upper side of the display unit 110 may be discharged to the outside of the door 20 through the first outlet 123 provided on the upper portion of the outer panel 120. The air flowing downward from the display unit 110 may be discharged to the outside of the door 20 through the second outlet 124 provided on the lower portion of the outer panel 120.

In this embodiment, the air flowing inside of the door 20 may cool the entire front surface of the display unit 110 while being discharged through the first outlet 123. In addition, the air flowing inside of the door 20 may effectively cool the heat-generating components mounted on the rear surface of the display unit 110 and inside of the door 20.

Figure 12:
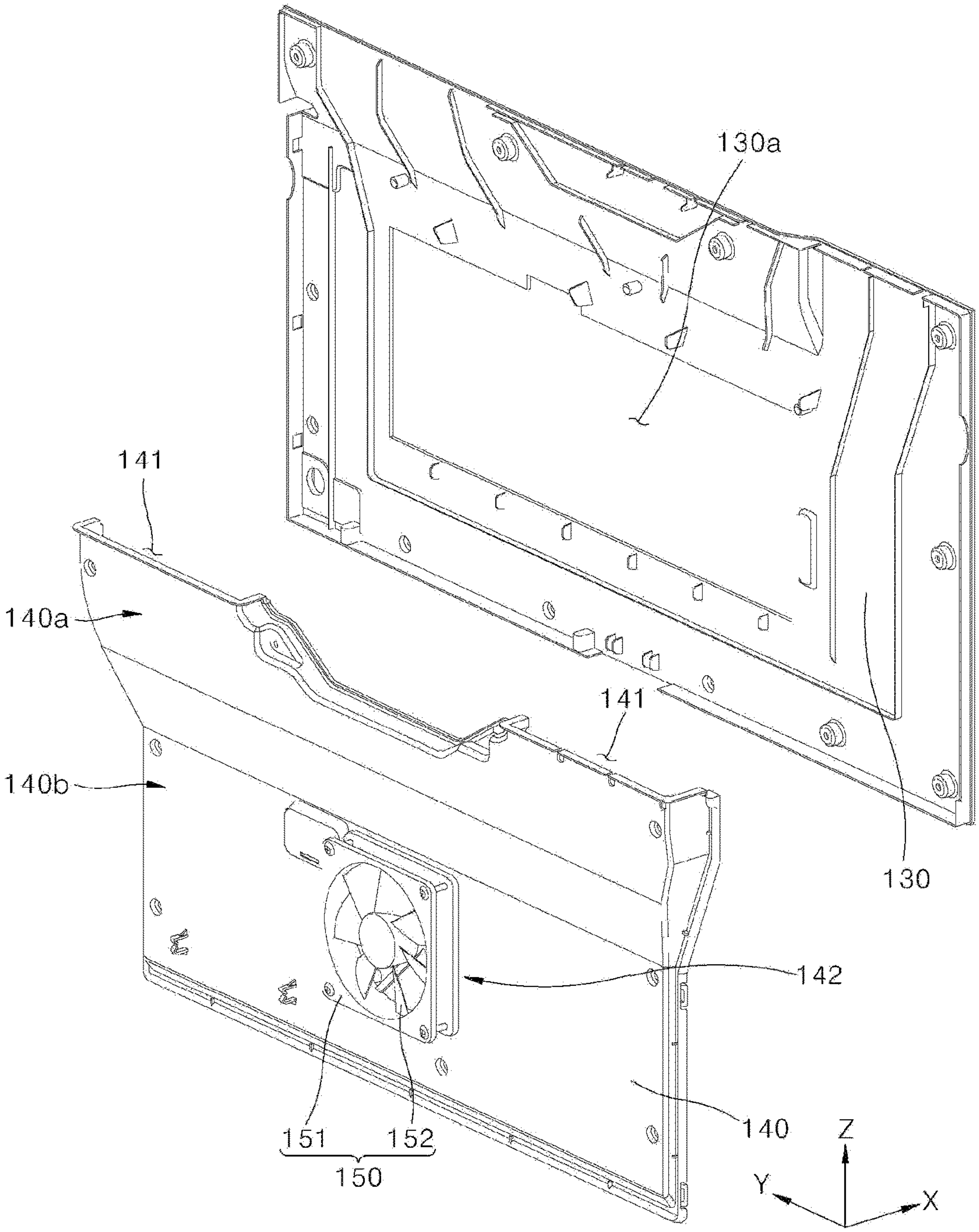
FIG. 12 is an exploded perspective view of the inner panel and air guide of FIG. 11.
Figure 13:
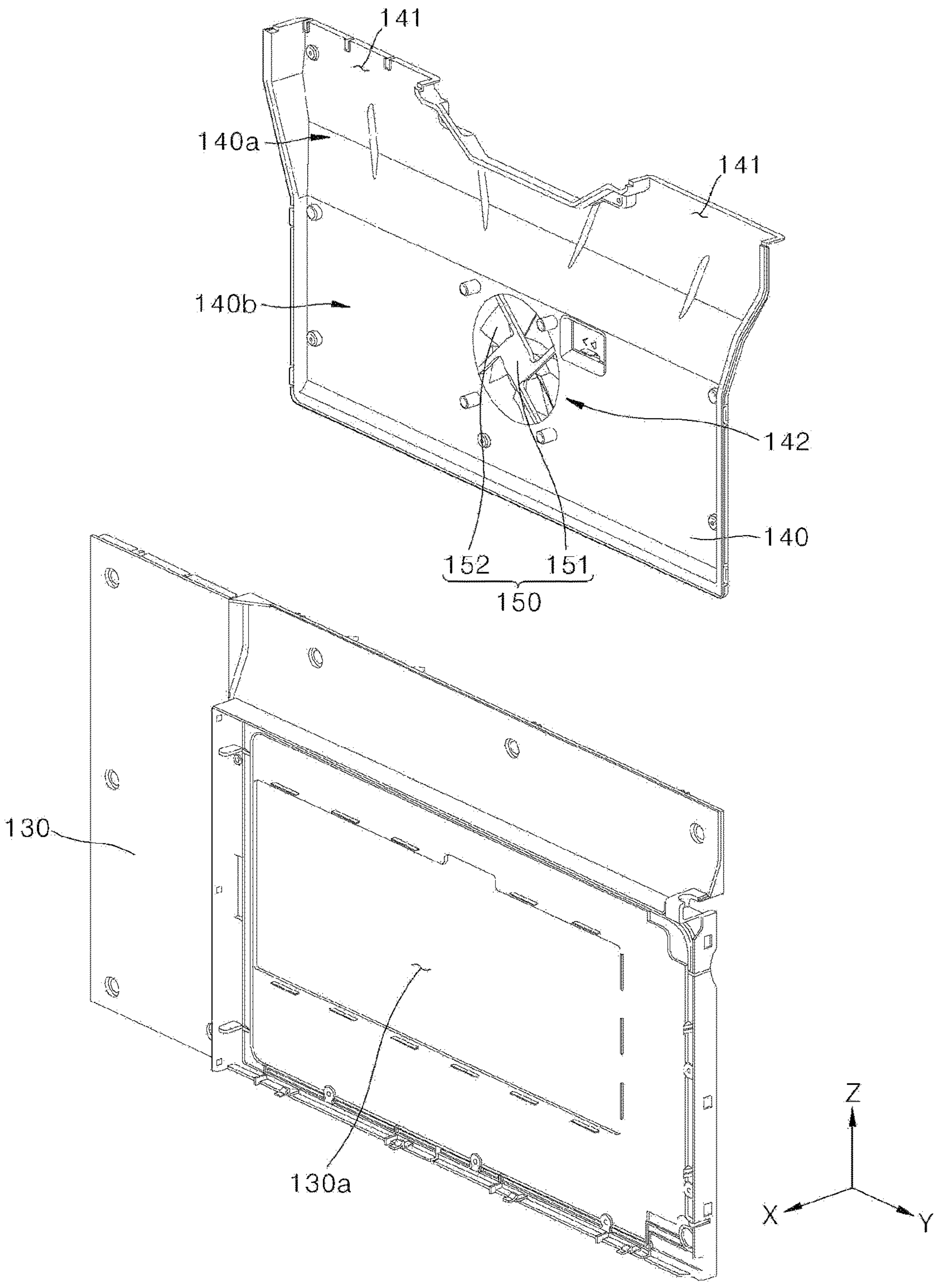
FIG. 13 is a view of the inner panel and air guide of FIG. 12 from another direction.
Figure 14:
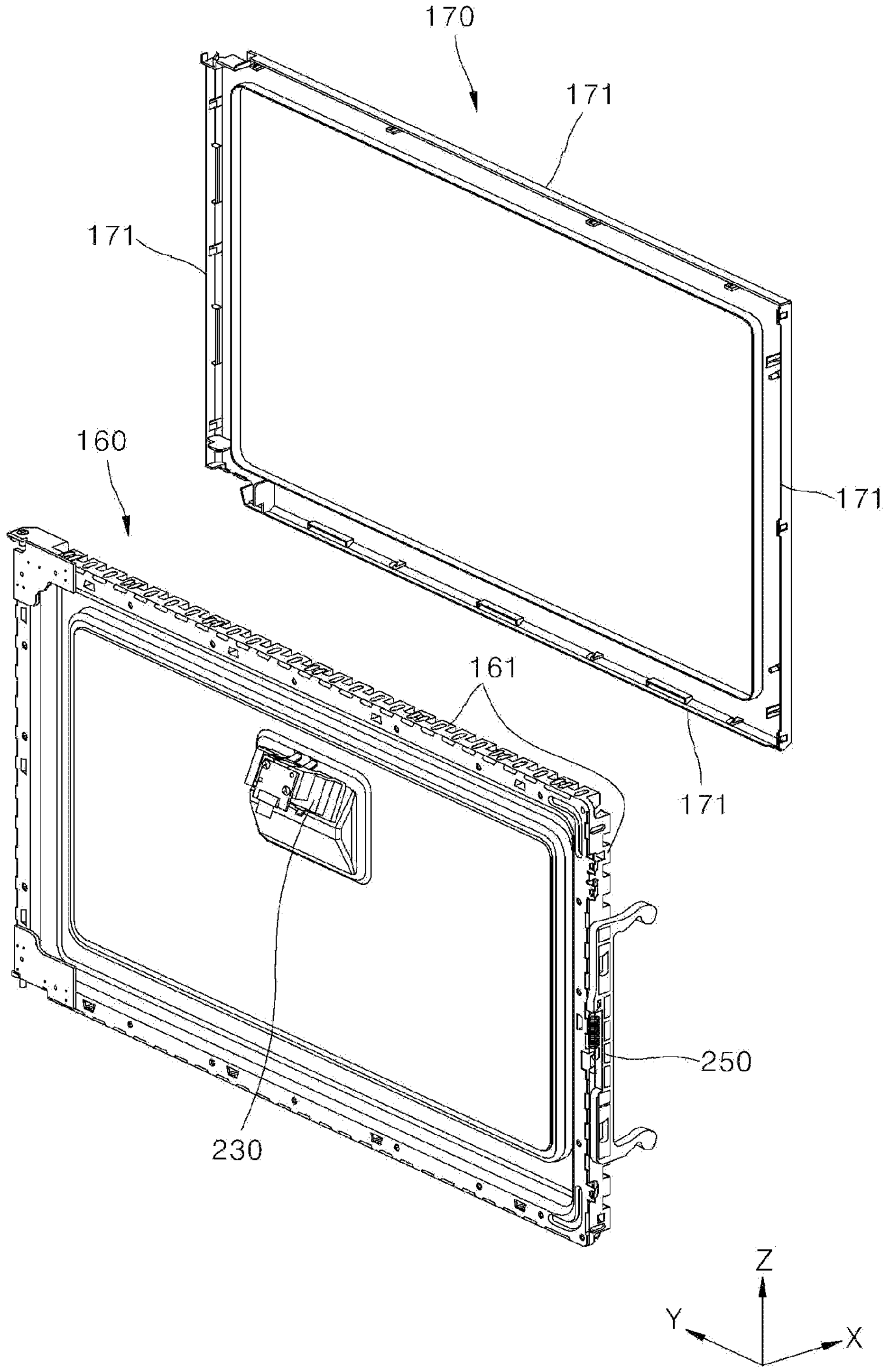
FIG. 14 is an exploded perspective view of a frame and a choke according to an embodiment.
Figure 15:
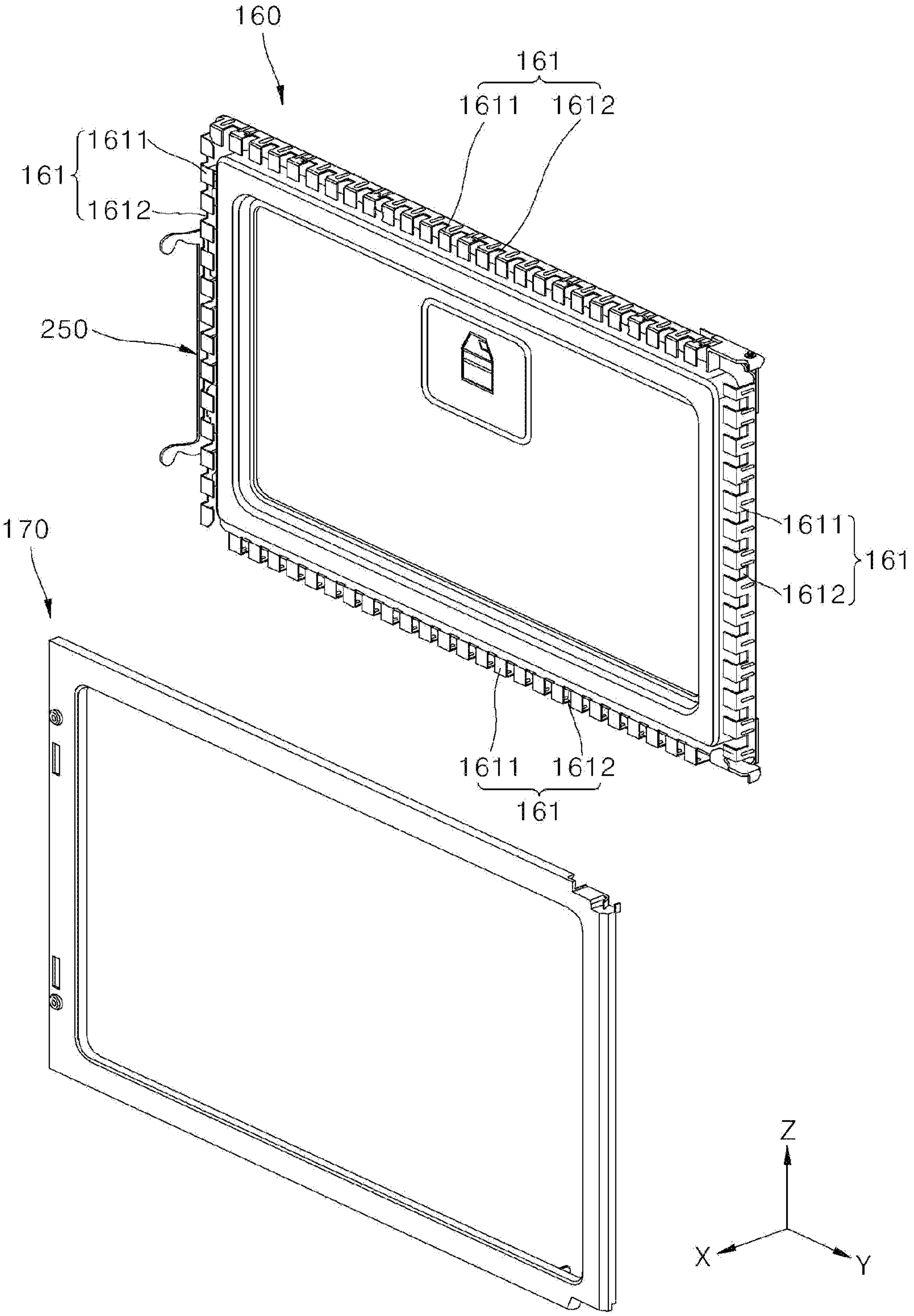
FIG. 15 is a view of the frame and choke of FIG. 14 from another direction.

FIG. 12 is an exploded perspective view of the inner panel and air guide of FIG. 11. FIG. 13 is a view of the inner panel and air guide of FIG. 12 from another direction. FIG. 14 is an exploded perspective view of a frame and choke according to an embodiment. FIG. 15 is a view of the frame and choke of FIG. 14 from another direction.

Referring to FIG. 13, the mounting hole 142 may be formed in the middle of the air guide 140. The casing 151 has a hollow having a location, size, and shape corresponding to the mounting hole 142, and the blowing fan 152 may be disposed in the hollow. The casing 151 may be disposed at a location corresponding to the hollow and the mounting hole 142 of the air guide 140 and mounted on one surface of the air guide 140.

A hollow 130*a* may be formed in the inner panel 130. As the hollow 130*a* of the inner panel 130 is blocked by the frame 160, the air introduced through the inlet 141 may not leak into the hollow 130*a* of the inner panel 130. Accordingly, the inner panel 130 and the frame 160 together may form a flow path through which the air cooling the inside of the door 20 may flow.

The door 20 may include a latch 250 mounted on a side of the frame 160, a portion of which protrudes from the frame 160. The latch 250 may be formed in a structure that is caught in a groove formed in the front panel 12 of the door 20. The latch 250 may stably maintain a state in which the door 20 is closed.

The air guide 140 may include an upper portion 140*a* in which the inlet 141 is formed and a lower portion 140*b* in which the blower 150 is disposed. When the air guide 140 and the inner panel 130 are coupled, the lower portion 140*b* may be generally disposed at a location corresponding to the hollow 130*a* of the inner panel 130.

When looking down at the air guide 140 from the upper portion of the door 20, a cross-sectional area of the upper portion 140*a* of the air guide 140 may be greater than a cross-sectional area of the lower portion 140*b*. As the cross-sectional area of the upper portion 140*a* is expanded, the cross-sectional area of the inlet 141 may also be expanded. Accordingly, in the air guide 140, as the inlet 141 through which air is introduced is expanded, external air may be easily introduced into the air guide 140.

The lower portion 140*b* of the air guide 140 may have a smaller cross-sectional area than that of the upper portion 140*a*, but as the lower portion 140*b* of the air guide 140 corresponds to the hollow 130*a* of the inner panel 130, the airflow space in the portion corresponding to the lower portion 140*b* may be expanded toward the frame 160 by the hollow 130*a* of the inner panel 130. As a result, the lower portion 140*b* of the air guide 140 may also have a shape in which the airflow space is expanded by the hollow 130*a* of the inner panel 130.

In other words, the lower portion 140*b* of the air guide 140 corresponding to the hollow 130*a* of the inner panel 130 may have a smaller cross-sectional area than that of the upper portion 140*a* of the air guide 140, but the flow space of the lower portion 140*b* of the air guide 140 may be expanded 160 by the hollow 130*a* of the inner panel 130.

Thus, the upper portion 140*a* and the lower portion 140*b* of the air guide 140 may have a shape of an expanded cross-sectional area due to the above-described structure. Accordingly, the airflow space formed by coupling the air guide 140 and the inner panel 130 may be sufficiently wide, and air may be smoothly introduced from the outside and may also smoothly pass through the blower 150 mounted on the lower portion 140*b* of the inner panel 130.

In addition, due to the decrease in the cross-sectional area of the lower portion 140*b* of the air guide 140, conversely, the space in which the air passing through the blower 150 is discharged from the lower portion 140*b* of the air guide 140 may be expanded. At this time, the air passing through the blower 150 may pass through the hollow 1201 of the outer panel 120 and come into contact with the display unit 110 to cool the display unit 110.

The above-described structure may allow the door 20 to have a slim overall structure and increase a flow rate of air flowing therein, thereby improving cooling efficiency of the door 20.

Referring to FIGS. 14 and 15, the frame 160 may include a sink unit or sink 161 formed on an edge to trap and dissipate electromagnetic waves. The sink 161 may be covered by the choke 170. Accordingly, the choke 170 may include an accommodating groove 171 provided to cover at least a portion of the sink 161.

The sink 161 may include a plurality of protrusions 1611 and a plurality of recesses 1612 alternately arranged along the edge of the frame 160. The plurality of protrusions 1611 and the plurality of recesses 1612 may be covered by the choke 170. The electromagnetic waves propagating from the cavity 11 may be collected in the sink 161 having a structure in which the plurality of protrusions 1611 and the plurality of recesses 1612 are alternately arranged, and the electromagnetic waves may be blocked from being propagated to the outside by the choke 170 and dissipated in the sink 161.

The accommodating groove 171 formed in the choke 170 may completely cover the sink 161 to prevent the electromagnetic waves collected in the sink 161 from escaping to the outside of the sink 161. Accordingly, the accommodating groove 171 may be formed by bending outer and inner portions of the choke 170 toward the sink 161, and provided so that a longitudinal direction is parallel to a direction in which the plurality of protrusions 1611 and the plurality of recesses 1612 are arranged.

This structure may allow the choke 170 to completely cover the sink 161, thereby preventing electromagnetic waves collected in the sink 161 from escaping to the outside of the sink 161. In this embodiment, it is possible to effectively prevent electromagnetic waves generated in the cavity 11 from propagating to the outside of the main body 10 by the sink 161 provided in the frame 160 and the choke 170 provided to cover the sink 161. Accordingly, it is possible to prevent user exposure to harmful electromagnetic waves, and to effectively prevent noise from being generated in the electronic components including the display unit 110 mounted on the door 20 disposed in front of the main body 10 by the electromagnetic waves.

Figure 16:
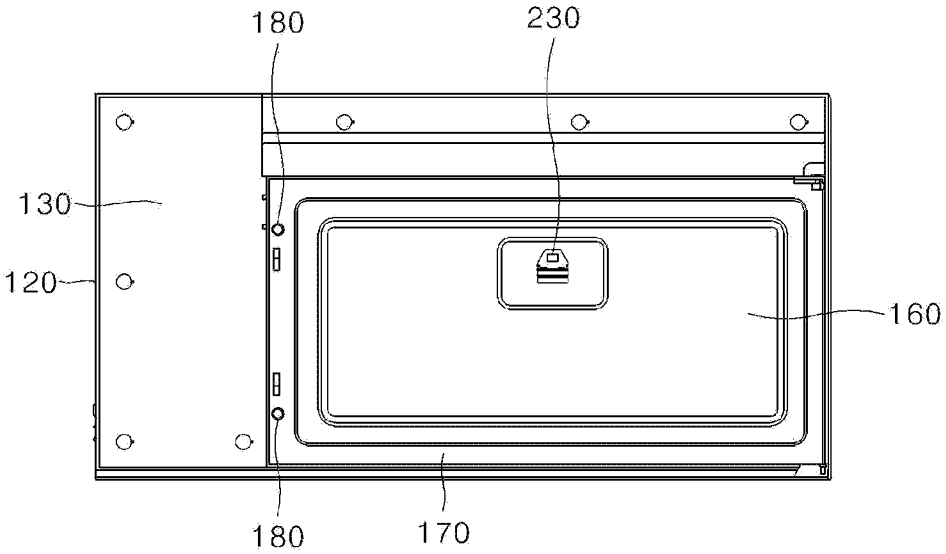
FIG. 16 is a rear view of the door according to an embodiment.

FIG. 16 is a rear view of the door according to an embodiment. The door 20 may further include at least one damper 180 mounted on the choke 170, and having one end exposed toward the main body 10.

The damper 180 may be disposed on the side of the choke 170. A plurality of the damper 180 may be provided, and a number thereof may be appropriately selected. The damper 180 may prevent the door 20 from colliding with the main body 10 to generate noise or to cause damage to the cooking appliance when the door 20 is opened and closed.

The damper 180 may be provided to come into contact with one surface of the front panel 12 when the door 20 is closed. The damper 180 may be made of a relatively flexible material to buffer shock occurring when the door 20 collides with the main body 10.

At the moment the door 20 is closed, the damper 180 may collide with the front panel 12. At this time, the damper 180 may be elastically deformed at the same time as it collides with the front panel 12 to buffer the shock, and thereafter, one surface of the door 20 and one surface of the main body 10 may come into contact with each other. Accordingly, the damper 180 may buffer the shock between the main body 10 and the door 20 occurring at the moment the door 20 is closed. In this embodiment, the damper 180 provided in the door 20 may buffer the shock between the main body 10 and the door 20 occurring at the moment the door 20 is closed, thereby effectively alleviating generation of noise and occurrence of damage to the cooking appliance due to repeated opening and closing of the door 20.

Figure 17:
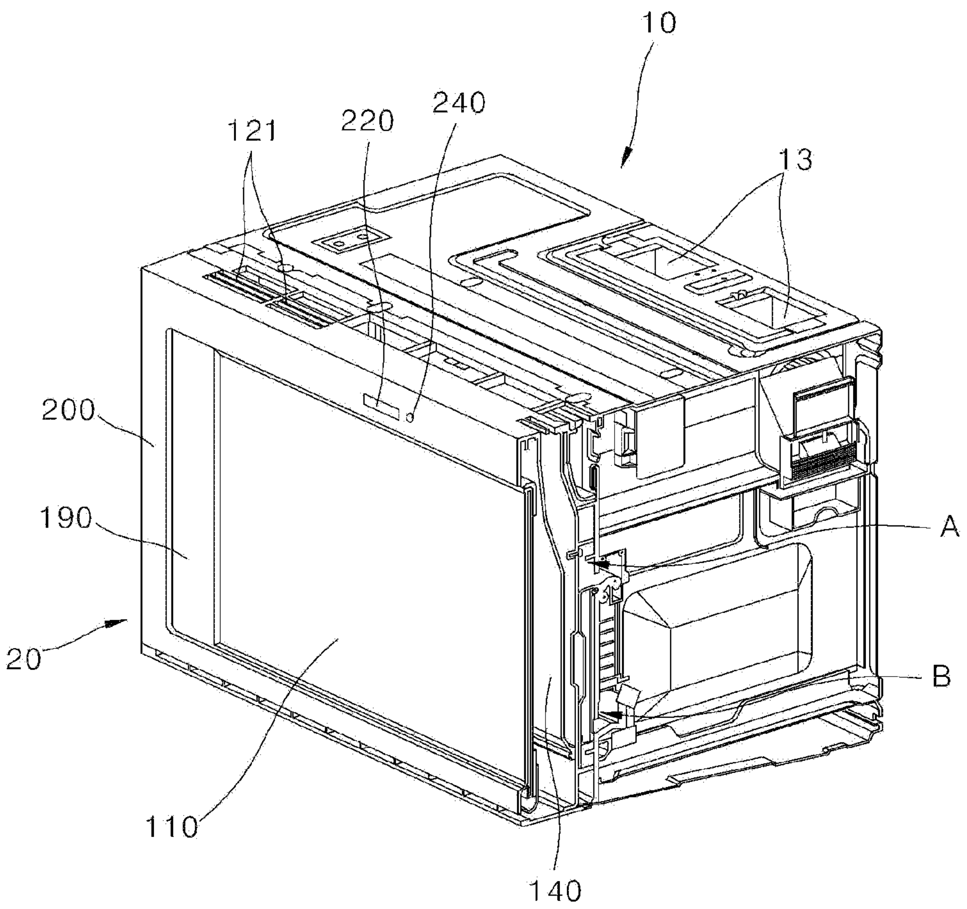
FIG. 17 is a cross-sectional perspective view of the cooking appliance according to an embodiment.
Figure 18A:
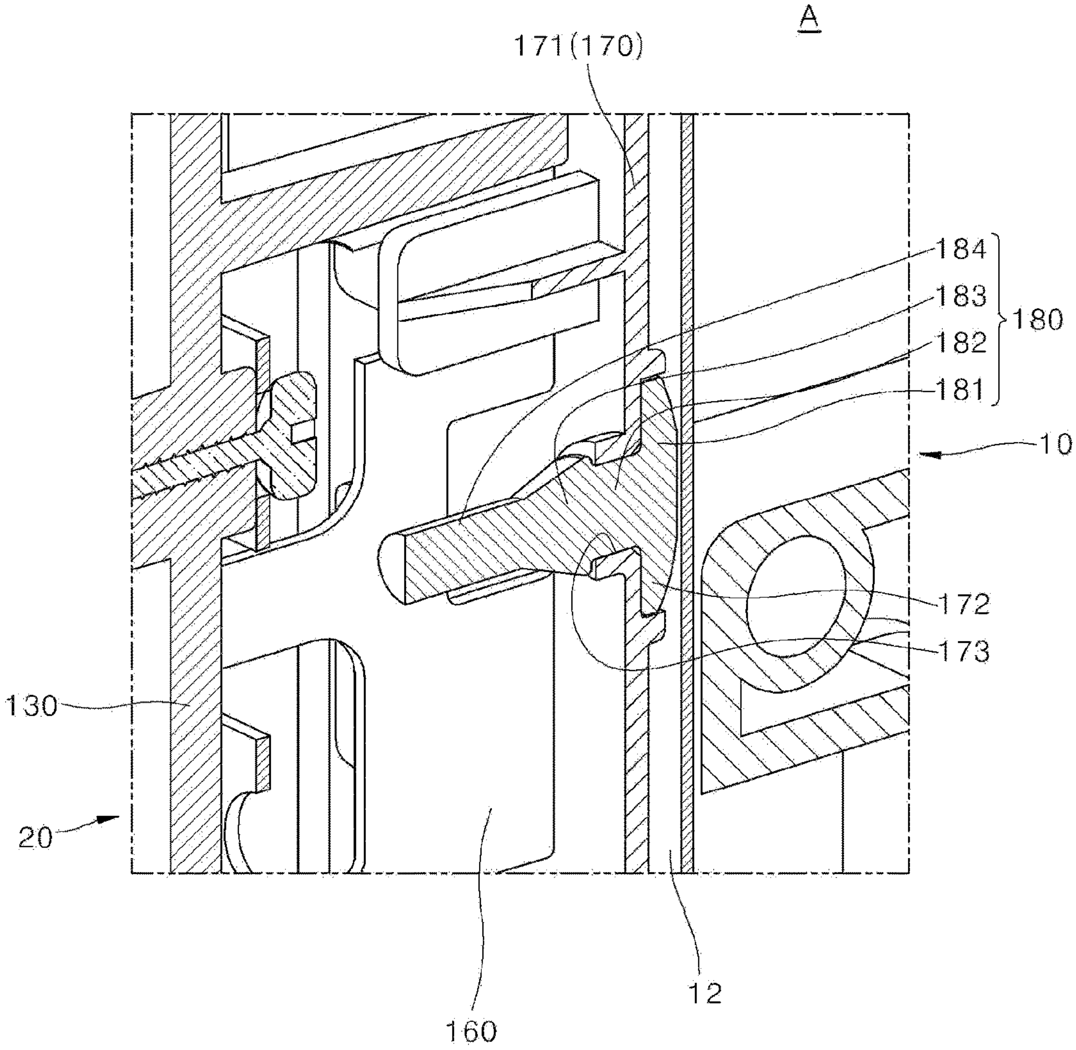
FIG. 18A is an enlarged view of a portion A of the cooking appliance of FIG. 17.
Figure 18B:
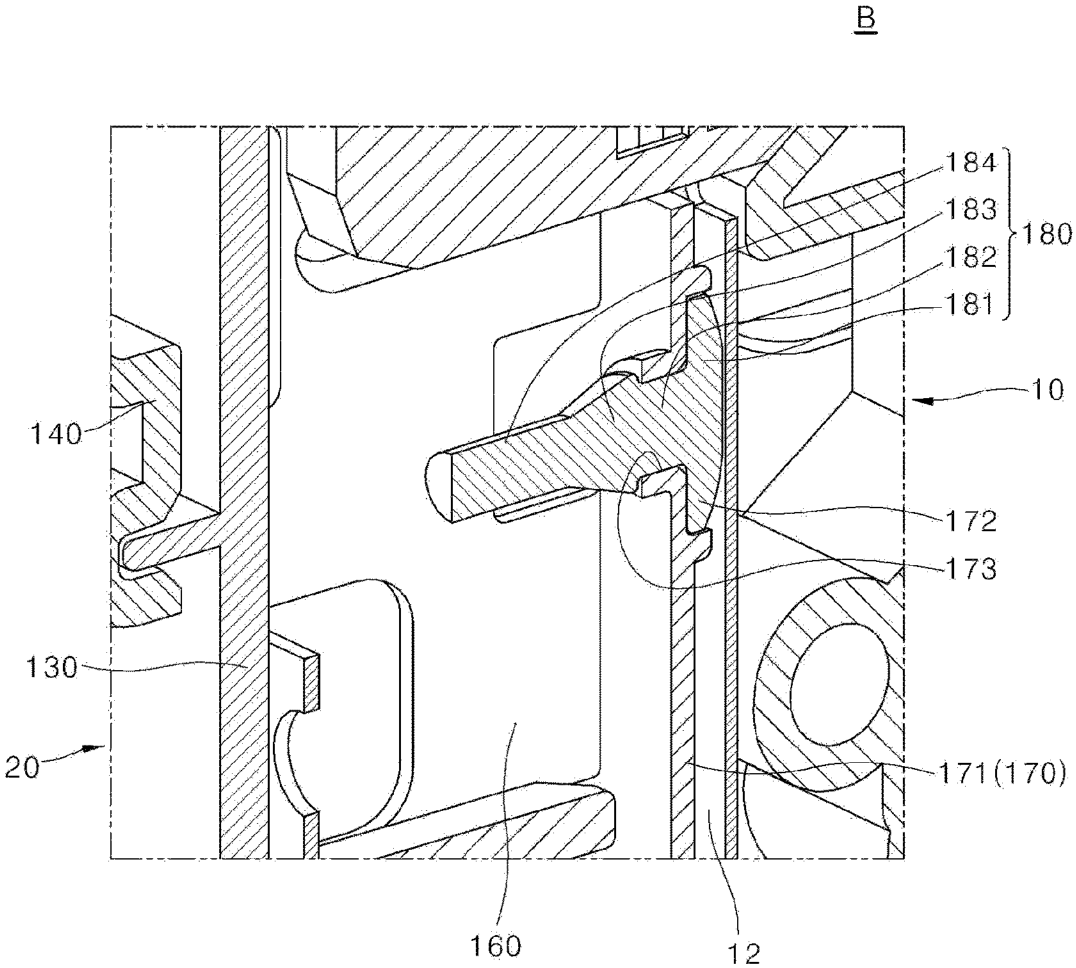
FIG. 18B is an enlarged view of a portion B of the cooking appliance of FIG. 17.
Figure 19:
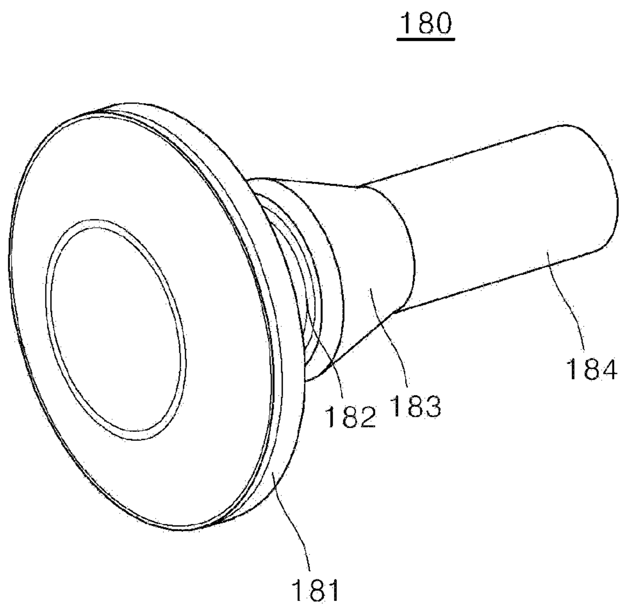
FIG. 19 is a perspective view of a damper according to an embodiment.

FIG. 17 is a cross-sectional perspective view of the cooking appliance according to an embodiment. FIG. 18A is an enlarged view of a portion A of the cooking appliance of FIG. 17. FIG. 18B is an enlarged view of a portion B of the cooking appliance of FIG. 17. FIG. 19 is a perspective view of the damper according to an embodiment.

The choke 170 may include a first seating groove 172 and a first through hole 173. The first seating groove 172 may be formed by recessing one surface of the choke 170, and one side of the damper 180 may be seated to be exposed toward the front panel 12.

The first through hole 173 may be formed inside of the first seating groove 172, may have a portion of the choke 170 formed to protrude therefrom, may have a portion of the choke 170 inserted thereinto, and may have a diameter shorter than a diameter of the first seating groove 172. As the damper 180 is made of a flexible material that is easy to elastically deform, the damper 180 may be elastically deformed and easily mounted in the first through hole 173 and the first seating groove 172 when an operator inserts and pressurizes the damper 180 into the first through hole 173.

In addition, the damper 180 may be provided in a shape that is stably mounted in the first seating groove 172 and the first through hole 173 of the choke 170. For example, the damper 180 may be formed to include a first cell 181, a second cell 182, a third cell 183, and a fourth cell 184.

The first cell 181 may be seated in the first seating groove 172 and may come into contact with one surface of the front panel 12 when the door 20 is closed. The first cell 181 may be exposed to the choke 170 and may have one surface colliding with and coming into contact with the front panel 12 and thus being elastically deformed, thereby buffering the shock between the door 20 and the main body 10.

When a width of the first cell 181, that is, a length in a direction perpendicular to a diameter direction of the first cell 181, is too small, a buffering ability of the damper 180 may be reduced. Conversely, when the width of the first cell 181 is too large, the door 20 and the main body 10 may not come into close contact with each other in a state in which the door 20 is closed. Accordingly, it is appropriate to select the width of the first cell 181 in consideration of the above.

The second cell 182 may protrude from the first cell 181, may be inserted into the first through hole 173, and may be formed to have a diameter shorter than that of the first cell 181. It is appropriate that a tolerance between the diameter of the first cell 181 and the first through hole 173 is properly designed so that the first cell 181 is tightly fitted into the first through hole 173.

The third cell 183 may protrude from the second cell 182, may be formed to have a diameter wider than that of the second cell 182 at a boundary point with the second cell 182, and may have a gradually reduced diameter in a direction away from the second cell 182. The fourth cell 184 may protrude from the third cell 183. Due to this structure of the third cell 183, when the damper 180 is pushed into the first through hole 173, the third cell 183 may be elastically deformed and at the same time, an inclined side surface of the third cell 183 may be slid from the side surface of the first through hole 173, so that the damper 180 may be inserted into the first through hole 173.

When the damper 180 is mounted on the choke 170, an upper surface of the third cell 183 may come into contact with one surface of the choke 170, thereby preventing the damper 180 from being separated from the first through hole 173. Due to this structure, the damper 180 mounted on the choke 170 may not be separated from the choke 170 and a state of being mounted on the choke 170 may be stably maintained even when the damper 180 receives repeated shocks due to the repeated opening and closing of the door 20.

Embodiments disclosed herein provide a cooking appliance having a display unit provided on a front surface in order to provide various types of information to the user. Embodiments disclosed herein further provide a cooking appliance having a display unit provided on a door of the cooking appliance using microwaves. Embodiments disclosed herein furthermore provide a cooking appliance having a structure capable of preventing heat and oil mist, for example, generated from a heating cooking device disposed thereunder from penetrating into a door.

Embodiments disclosed herein provide a cooking appliance having a structure capable of preventing a display unit from being contaminated by oil mist. Embodiments disclosed herein also provide a cooking appliance having a cooling structure of a display module attached to a front surface of a door. Embodiments disclosed herein provide a cooking appliance having a structure capable of preventing heat and oil mist, for example, from penetrating into a door by forming an air curtain outside of the door.

Embodiments disclosed herein provide a cooking appliance having a door equipped with a display unit on a front surface thereof and formed with a cooling structure for cooling the display unit and a microwave shielding structure for preventing microwave leakage. In addition, embodiments disclosed herein provide a cooking appliance having a structure capable of buffering a shock generated between a door and a main body when the door is opened and closed.

Advantages are not limited to the above-described advantages, and other advantages not mentioned may be understood from the description, and will be more clearly understood from the embodiments. In addition, it will be easily seen that advantages may be realized by the means described in the claims and combinations thereof.

A cooking appliance according to embodiments disclosed herein may include a main body formed with a cavity, and a door that opens and closes the cavity. The door may include a display module disposed in front of the door, a cooling flow path unit behind the display module, and having a flow path through which air for cooling flows formed therein, and a shielding unit disposed behind the cooling flow path unit and configured to shield electromagnetic waves generated from the main body. The cooling flow path unit is disposed between the shielding unit and the display module. The air flowing through the cooling flow path unit may be branched from an inside of the cooling flow path unit to be discharged to a top and bottom of the display module.

The door may include a display unit configured to display videos or images, an outer panel disposed behind the display unit and on which the display unit is mounted, an inner panel disposed behind the outer panel and mounted on the outer panel, an air guide disposed between the outer panel and the inner panel and coupled to the inner panel, and a blowing device or blower mounted on the air guide. The door may include a first outlet disposed on an upper portion of the door, and through which the air blown by the blowing device may be discharged to the outside, and a second outlet disposed on a lower portion of the door, and through which the air blown by the blowing device may be discharged to the outside.

The air guide may include at least one inlet disposed on an upper portion, and through which external air may be introduced, and a mounting hole formed under the inlet, and in which the blowing device may be mounted. The blowing device may include a casing disposed in the mounting hole, and a blowing fan rotatably mounted in the casing and blowing air from a rear to a front of the air guide.

As the blowing fan rotates, external air may flow into the door through the inlet of the air guide, and flow to be discharged to the outside of the door through the first outlet and the second outlet. The air forcibly blown by the blowing fan may specifically have the following flow path.

The air may flow into the door from a first aperture of the outer panel and the inlet provided at a location corresponding thereto. The air flowing into the door may flow downward from the door to flow into the blowing fan.

The air may pass through the blowing fan in a frontward-rearward direction of the door. At this time, the air may pass through the mounting hole of the air guide while passing through the blowing fan. A flow direction of the air may be changed from an upward-downward direction to a frontward-rearward direction of the door in the blowing fan.

As a front of the mounting hole is closed by the display unit, the air passed through the mounting hole may be branched in front of the air guide in the upward-downward direction. A part or first portion of the branched air may flow in an upper direction of the door to be discharged through the first outlet. The other part or a second portion of the branched air may flow in a downward direction of the door to be discharged through the second outlet. The cooling flow path unit may be configured to guide air introduced at an upper surface of the door towards a rear surface of the display module, such that the air may flow in an upward and a downward direction along the rear surface of the display module for cooling the same before being discharged to an outside of the door.

The door may further include a frame disposed behind the inner panel, coupled to the inner panel, and having one side rotatably coupled to the main body, and a choke member or choke disposed behind the frame, coupled to the frame, and configured to block electromagnetic waves generated from the main body from being discharged to the outside. The may be coupled to a rear surface of the cooling flow path unit. The frame may include a sink unit or sink formed on an edge to trap and dissipate the electromagnetic waves.

The choke member may include an accommodating groove provided to cover at least a part or portion of the sink unit. The sink unit may be provided so that a plurality of protrusions and a plurality of recesses are alternately arranged along an edge of the frame. The accommodating groove may be formed by bending outer and inner portions of the choke member toward the sink unit, and provided so that a longitudinal direction is parallel to a direction in which the protrusions and the recesses are arranged.

The door may further include at least one damper mounted on the shielding unit or the choke member, and having one side provided to be exposed toward the main body.

The main body may further include a front panel provided on an edge of an entrance of the cavity, and having one surface disposed to face one surface of the shielding unit or the choke member when the door is closed to close the cavity. The damper may be provided to come into contact with one surface of the front panel when the door is closed.

The choke member may include a first seating groove configured to seat one side of the damper to be exposed toward the front panel, and a first through hole formed inside of the first seating groove, formed so that a part or portion of the choke member protrudes, having a part or portion of the choke member inserted thereinto, and formed to have a diameter shorter than that of the first seating groove.

The damper may include a first cell seated in the first seating groove and coming into contact with one surface of the front panel when the door is closed, a second cell that protrudes from the first cell, inserted into the first through hole, and formed to have a diameter smaller than that of the first cell, a third cell that protrudes from the second cell, formed to have a diameter longer than that of the second cell at a boundary point with the second cell, and having a gradually reduced diameter in a direction away from the second cell, and a fourth cell that protrudes from the third cell.

The door may further include a baffle that is disposed in front of the display unit, surrounds an edge of the display unit, and coupled to the outer panel to mount the display unit on the outer panel, and a front cover that is disposed in front of the baffle, and surrounds an edge of the baffle. The door may further include a first camera mounted on the lower portion of the outer panel to capture a state of a lower portion of the door, a second camera disposed on an upper portion of the door, mounted by passing through the baffle and the front cover, and capturing an image of a front of the door, and a third camera mounted on the frame, disposed to face the cavity, and capturing an image of the cavity.

In the cooking appliance according to embodiments disclosed herein, as the display module is provided at the front of the door, the user may know a cooking situation in the cooking appliance through the display module. The display module may serve as a hub of another home appliance to provide various types of information to the user, thereby enhancing user convenience.

Further, in the cooking appliance according to embodiments disclosed herein, the airflow discharged to the outside of the door through the first outlet and the second outlet provided in the door may form an air curtain, so that heat and oil mist rising from a heating cooking device disposed below the cooking appliance may be effectively blocked by the air curtain. Accordingly, it is possible to effectively prevent various electronic components including the display unit provided on the door from being damaged or degraded by the heat and the oil mist. In addition, it is possible to prevent the display unit from being contaminated by the heat and the oil mist and thus giving inconvenience to the user.

Furthermore, in the cooking appliance according to embodiments disclosed herein, the air flowing inside of the door may be discharged through the first outlet to cool the entire front surface of the display unit. In addition, the air flowing inside of the door may effectively cool the heat-generating components mounted on the rear surface of the display unit and inside of the door.

In addition, in the cooking appliance according to embodiments disclosed herein, a door having all of the display structure, the cooling structure, and the shielding structure of the electromagnetic waves may be formed. The display structure, the cooling structure, and the shielding structure may be coupled to one another to slimly form the door as a whole. Accordingly, it is possible to prevent a thickness of the door from being increased even when all of the display structure, the cooling structure, and the shielding structure are formed on the door.

Also, in the cooking appliance according to embodiments disclosed herein, it is possible to effectively prevent electromagnetic waves generated in the cavity from propagating to the outside of the main body by the sink provided on the frame and the choke provided to cover the sink. Accordingly, it is possible to prevent user exposure to harmful electromagnetic waves, and effectively prevent noise from being generated by the electromagnetic waves in the electronic components including the display unit mounted on the door disposed on the front of the main body.

In the cooking appliance according to embodiments disclosed herein, the damper provided on the door may buffer shock between the main body and the door occurring at a moment the door is closed, thereby effectively alleviating generation of noise and the occurrence of damage to the cooking appliance due to repeated opening and closing of the door.

Embodiments have been described with reference to the exemplary drawings, but it is apparent that the embodiments are not limited by the embodiments and drawings disclosed in this specification, and various modifications may be possible by those skilled in the art without departing from the technical spirit. In addition, although operations and effects according to the configuration have not been explicitly disclosed and described while describing the embodiments, it goes without saying that the predictable effect by the corresponding configuration should also be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower" and "upper", for example, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance including a main body having a cavity, and a door that opens and closes the cavity, wherein the door includes:
- a display module including a display unit disposed at a front of the door;
- a cooling flow path unit disposed behind the display module, and having formed therein a flow path through which air for cooling flows; and
- a shielding unit disposed behind the cooling flow path unit, and configured to shield electromagnetic waves generated from the main body, wherein the cooling flow path unit is disposed between the shielding unit and the display module, wherein the display module includes:
  - the display unit configured to display videos or images; and
  - an outer panel disposed behind the display unit, and on which the display unit is mounted, and wherein the cooling flow path unit includes:
    - an inner panel disposed behind the outer panel, and mounted on the outer panel; and
    - an air guide disposed between the outer panel and the inner panel, and coupled to the inner panel.

2. The cooking appliance of claim 1, wherein the door includes:
- a first outlet disposed at an upper portion of the door, and through which the air flowing inside of the display module is discharged to an outside; and
- a second outlet disposed at a lower portion of the door, and through which the air flowing inside of the display module is discharged to the outside.

3. The cooking appliance of claim 1,
wherein the cooling flow path unit further includes
a blower mounted on the air guide.

4. The cooking appliance of claim 3, wherein the air guide includes:
- at least one inlet disposed on an upper portion thereof, and through which external air is introduced; and
- a mounting hole formed under the at least one inlet, and in which the blower is mounted.

5. The cooking appliance of claim 4, wherein the blower includes:
- a casing disposed in the mounting hole; and
- a fan rotatably mounted in the casing, and blowing air from a rear to a front of the air guide.

6. The cooking appliance of claim 3, wherein the door includes:
- at least one speaker mounted on a side of the outer panel;
- a microphone mounted on a top of the outer panel; and
- a communication unit mounted on the outer panel at a location spaced apart from the speaker and the microphone.

7. The cooking appliance of claim 1, wherein the air flowing through the cooling flow path unit is branched from an inside of the cooling flow path unit to be discharged to a top and bottom of the display module.

8. The cooking appliance of claim 1, wherein the cooling flow path unit is configured to guide air introduced at an upper surface of the door towards a rear surface of the display module, such that the air flows in an upward and a downward direction along the rear surface of the display module for cooling the same before being discharged to an outside of the door.

9. The cooking appliance of claim 1, wherein the door further includes at least one damper mounted on the shielding unit, a first side of the damper facing the main body.

10. The cooking appliance of claim 9, wherein the main body further includes a front panel provided at an edge of an entrance of the cavity, and having a surface facing the shielding unit when the door is closed to close the cavity, and wherein the at least one damper comes into contact with a surface of the front panel when the door is closed.

11. The cooking appliance of claim 10, wherein the shielding unit further includes a choke blocking the electromagnetic waves generated from the main body from being discharged to an outside, and wherein the choke includes:
- a first seating groove configured to seat a second side of the at least one damper to be exposed toward the front panel; and
- a first through hole formed inside of the first seating groove, formed so that a portion of the choke protrudes therefrom, having a portion of the choke inserted therein, and formed to have a diameter smaller than a diameter of the first seating groove.

12. The cooking appliance of claim 11, wherein the at least one damper includes:
- a first cell seated in the first seating groove, and coming into contact with the surface of the front panel when the door is closed;
- a second cell that protrudes from the first cell, inserted into the first through hole, and formed to have a diameter smaller than a diameter of the first cell;
- a third cell that protrudes from the second cell, formed to have a diameter larger than a diameter of the second cell at a boundary point with the second cell, and having a gradually reduced diameter in a direction away from the second cell; and
- a fourth cell that protrudes from the third cell.

13. A cooking appliance including a main body having a cavity, and a door that opens and closes the cavity, wherein the door includes:
- a display module including a display unit disposed at a front of the door;
- a cooling flow path unit disposed behind the display module, and having formed therein a flow path through which air for cooling flows; and
- a shielding unit disposed behind the cooling flow path unit, and configured to shield electromagnetic waves generated from the main body, wherein the shielding unit includes:
  - a frame coupled to a rear surface of the cooling flow path unit; and
  - a choke disposed behind the frame, coupled to the frame, and blocking the electromagnetic waves generated from the main body from being discharged to the outside.

14. The cooking appliance of claim 13, wherein the frame includes a sink formed on an edge to trap and dissipate the electromagnetic waves, and wherein the choke includes an accommodating groove provided to cover at least a portion of the sink.

15. The cooking appliance of claim 14, wherein the sink includes a plurality of protrusions and a plurality of recesses alternately arranged along an edge of the frame.

16. The cooking appliance of claim 15, wherein the accommodating groove is formed by bending outer and inner portions of the choke toward the sink, and wherein a longitudinal direction of the accommodating groove extends parallel to a direction in which the plurality of protrusions and the plurality of recesses are arranged.

17. A cooking appliance including a main body having a cavity, and a door that opens and closes the cavity, wherein the door includes:

a display module including a display unit disposed at a front of the door;

a cooling flow path unit disposed behind the display module, and having formed therein a flow path through which air for cooling flows;

a shielding unit disposed behind the cooling flow path unit, and configured to shield electromagnetic waves generated from the main body;

a baffle that is disposed in front of the display unit, and surrounds an edge of the display unit; and a front cover that is disposed in front of the baffle and surrounds an edge of the baffle.

18. The cooking appliance of claim 17, wherein the door further includes:

a first camera mounted on a lower portion of the door to capture a state of a lower side of the door;

a second camera disposed on an upper portion of the door, mounted by passing through the baffle and the front cover, and capturing a state of the front of the door; and a third camera mounted on the shielding unit, disposed to face the cavity, and capturing a state of the cavity.

19. The cooking appliance of claim 18, wherein the door further includes a human detector disposed on the upper portion of the door, mounted by passing through the baffle and the front cover, disposed at a location spaced apart from the second camera, and configured to detect a presence of a user in front of the cooking appliance.

20. The cooking appliance of claim 6, wherein a plurality of communication units is provided, and each of the communication units is provided as any one of a ZigBee communication device, a Wi-Fi communication device, a jet wave communication device, or a Bluetooth communication device.

* * * * *